US009709079B2

(12) United States Patent  
Myers et al.

(10) Patent No.: US 9,709,079 B2  
(45) Date of Patent: Jul. 18, 2017

(54) CONVEYING SYSTEM ACTUATORS AS WELL AS CONVEYOR ASSEMBLIES AND CONVEYING SYSTEMS INCLUDING SAME

(71) Applicant: Firestone Industrial Products Company, LLC, Indianapolis, IN (US)

(72) Inventors: J. Richard Myers, Fishers, IN (US); Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/969,880

(22) Filed: Dec. 15, 2015

(65) Prior Publication Data

US 2016/0167893 A1    Jun. 16, 2016

Related U.S. Application Data

(60) Provisional application No. 62/092,247, filed on Dec. 15, 2014.

(51) Int. Cl.
| | |
|---|---|
| B65G 45/16 | (2006.01) |
| B65G 47/46 | (2006.01) |
| F15B 15/10 | (2006.01) |
| B65G 17/24 | (2006.01) |

(52) U.S. Cl.  
CPC .............. *F15B 15/10* (2013.01); *B65G 17/24* (2013.01)

(58) Field of Classification Search  
CPC ........ B65G 47/52; B65G 47/53; B65G 47/54; B65G 13/065; B65G 47/71; B65G 45/16

USPC ...................... 198/370.09, 370.1, 371.3, 499  
See application file for complete search history.

(56) References Cited

U.S. PATENT DOCUMENTS

| | | | | |
|---|---|---|---|---|
| 3,680,692 A | * | 8/1972 | Southworth | .............. B07C 5/10 198/367 |
| 4,290,520 A | * | 9/1981 | Rhodes | .................. B65G 45/16 15/256.5 |
| 5,165,516 A | * | 11/1992 | Reed | ...................... B65G 47/54 198/370.1 |
| 5,213,197 A | * | 5/1993 | Mohri | .................... B65G 45/16 198/499 |
| 5,609,236 A | * | 3/1997 | Neukam | ................ B65G 47/54 198/370.08 |
| 6,182,813 B1 | * | 2/2001 | Bonnet | .................. B65G 47/54 198/370.09 |

(Continued)

*Primary Examiner* — James R Bidwell  
(74) *Attorney, Agent, or Firm* — Thomas R. Kingsbury; Fay Sharpe LLP

(57) ABSTRACT

Conveyor actuator assemblies include a gas spring assembly and a base element that at least partially defines a channel extending therethrough. The gas spring assembly extends through the channel. A first end element receives part of the gas spring assembly and a second end element receives another part of the gas spring assembly. A piston element is disposed within the channel and projects outward beyond the base element through an open side to a distal end dimensioned for engaging an associated conveyor belt. The gas spring assembly is inflatable between a first condition in which the piston element is disposed in a first position relative to the base element, and a second condition in which the piston element is disposed in a second position relative to the base element that is different than the first position. Conveyor assemblies, conveying systems and methods of assembly are also included.

20 Claims, 23 Drawing Sheets

(56) References Cited

U.S. PATENT DOCUMENTS

| | | | | |
|---|---|---|---|---|
| 6,213,287 B1* | 4/2001 | Juracko | ................ | B65G 45/16 |
| | | | | 198/499 |
| 6,227,350 B1* | 5/2001 | Yoshizako | ............ | B65G 45/12 |
| | | | | 15/256.5 |
| 6,382,393 B2* | 5/2002 | Itoh | ...................... | B65G 47/54 |
| | | | | 198/370.09 |
| 6,655,893 B2* | 12/2003 | Kelly | .................... | B65G 67/20 |
| | | | | 198/370.01 |
| 2003/0227528 A1* | 12/2003 | Hohberger | ............ | B41J 3/4075 |
| | | | | 347/104 |
| 2009/0255782 A1* | 10/2009 | McBride | ............... | B65G 45/16 |
| | | | | 198/499 |

\* cited by examiner

CONVEYING SYSTEM ACTUATORS AS WELL AS CONVEYOR ASSEMBLIES AND CONVEYING SYSTEMS INCLUDING SAME

BACKGROUND

The subject matter of the present disclosure broadly relates to the art of material handling systems and, more particularly, to conveyor belt actuators selectively operable to support an edge or other portion of a conveyor belt. Conveyor assemblies and conveying systems including one or more of such actuators are also included.

The subject matter of the present disclosure may find particular application and use in conjunction with components for material handling systems, such as conveying systems that utilize one or more belts or bands assembled into an endless loop, and will be shown and described herein with reference thereto. However, it is to be appreciated that the subject matter of the present disclosure is also amenable to use in other applications and environments, and that the specific uses shown and described herein are merely exemplary.

Conveying systems of a variety of type, kinds and constructions have been developed that are well known and commonly used for a wide variety of purposes and in a broad range of operating environments. In mining, power generation and heavy industrial applications, conveying systems can be used to transport mined materials (e.g., coal) over great distanced, such as from a mining site or stockpile to a distribution or usage site, for example. In packaging and material handling application, conveying systems can be used to transport, arrange and sort packages and other objects, such as for distribution, bulk packaging (e.g., palletization) and/or loading on transport vehicles, for example.

As industries seek increased productivity, demands for improved performance of conveying systems that handle materials have likewise increased. In many cases, the design and/or construction of systems and components of conveying systems will have both positive and negative influences on performance characteristics of such conveying systems, and achieving a desired balance of such influences remains an ongoing challenge. For example, a system or component having a substantial size and mass may provide increased performance in the form of strength, rigidity and/or robustness. In cases in which such a system or component undergoes displacement, however, a decrease in performance (e.g., speed of actuation or other operation) and/or increased energy consumption can result. As such, reducing the weight associated with one or more components and/or assemblies of conveying systems while maintaining (or improving) characteristics such as strength, rigidity and robustness may contribute to a desired increase in performance of conveying systems.

Notwithstanding the overall success of known constructions, it is believed that a need exists to meet these competing and/or other goals while still retaining comparable or improved performance, ease of manufacture, reduced cost of manufacture and/or otherwise advancing the art of material handling systems.

BRIEF SUMMARY

One example of a conveyor actuator assembly in accordance with the subject matter of the present disclosure can include a gas spring assembly having a longitudinal axis. The gas spring assembly can include a flexible spring member, a first end member secured to a first end of the flexible spring member and a second end member secured to a second end of the flexible spring member such that a spring chamber is formed within the flexible spring member between the first and second end members. A base element can include a base element wall at least partially defines a channel extending longitudinally between a first open end and a second open end. The channel can also include an open side extending longitudinally between the first and second open ends with at least a portion of the gas spring assembly disposed within the channel. A first end element can receive at least a portion of at least one of the first end member and the flexible spring member. The first end element can be secured along the base element and close the first open end of the channel. A second end element can receive at least a portion of at least one of the second end member and the flexible spring member. The second end element can be secured along the base element and close the second open end of the channel. A piston element can be at least partially disposed within the channel and can project outward beyond the base element through the open side of the channel to a distal end dimensioned for engaging an associated conveyor belt.

One example of a conveyor assembly in accordance with the subject matter of the present disclosure can include a frame assembly extending lengthwise between a first end and a second end. A drive roller can be supported along the first end of the frame assembly. An idler roller can be supported along the second end of the frame assembly. A conveyor belt can be operatively connected in an endless manner along the frame assembly and can be displaceable upon rotation of the drive roller and the idler roller. The conveyor belt can have an outward-facing side and an inward-facing side. A conveyor actuator assembly according to the foregoing paragraph can be disposed between the frame assembly and the inward-facing side of the conveyor belt.

One example of a conveying system in accordance with the subject matter of the present disclosure can include at least one conveyor actuator assembly according to the foregoing paragraph. The conveying system can also include a pressurized gas system that can include a pressurized gas source and a control device with at least one of the pressurized gas source and the control device in fluid communication with the spring chamber of the gas spring assembly of the at least one conveyor actuator assembly.

One example of a method of assembly in accordance with the subject matter of the present disclosure can include providing a gas spring assembly. The gas spring assembly can include a flexible spring member, a first end member secured to a first end of the flexible spring member and a second end member secured to a second end of the flexible spring member such that a spring chamber is formed within the flexible spring member between the first and second end members. The method can also include providing a base element that includes a base element wall that at least partially defines a channel extending between a first open end and a second open end with an open side extending longitudinally between the first and second open ends. The method can further include extending at least a portion of the gas spring assembly into the channel as well as providing a first end element and securing the first end member along the first end element. The method can also include securing the first end element along a first end of the base element and thereby closing the first open end of the channel. The method can further include providing a second end element as well as securing the second end member along the second end element and securing the second end element along a second end of the base element and thereby closing the second open end of the channel. The method can also include providing a piston element and inserting the piston element within the channel such that a portion of the piston element projects outward beyond the base element through the open side of the channel to a distal end that is dimensioned for engaging an associated conveyor belt with at least a portion of the gas spring assembly captured between the piston element and the base element.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and ease of understanding.

Figure 1:
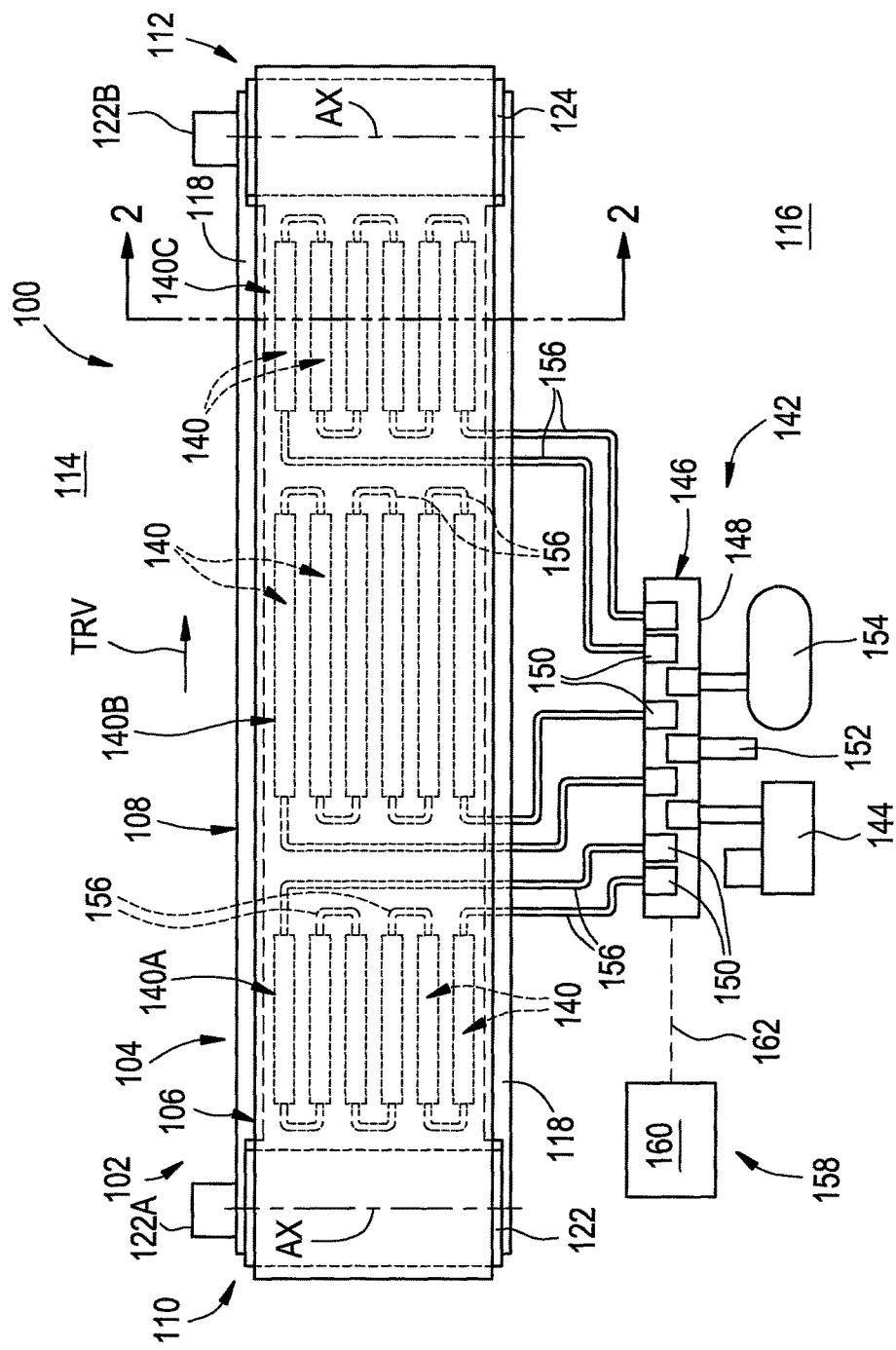
FIG. 1 is a schematic representation of one example of a conveying system that includes one or more actuators in accordance with the subject matter of the present disclosure.

FIG. 1 illustrates one example of a conveying system 100 such as may be suitable for use in transporting materials. It will be appreciated that any such conveying systems are commonly used in connection with one or more other systems and/or devices (not shown). Additionally, it will be appreciated that conveying system 100 can include any number of one or more systems, components and/or devices, and that the conveying system can be operatively associated with any such other systems and/or devices in any suitable manner.

Figure 2:
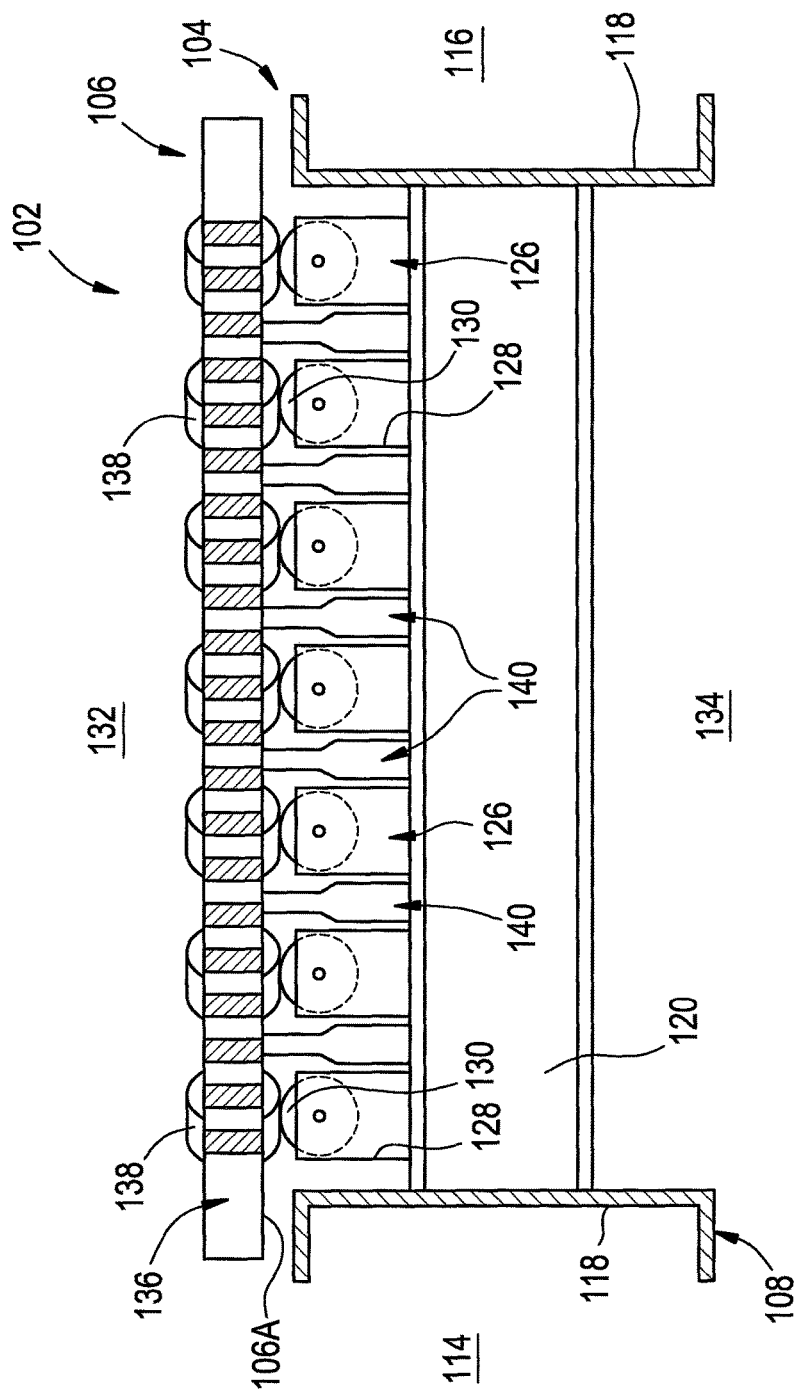
FIG. 2 is a side view, in partial cross section, of the exemplary conveying system shown in FIG. 1 taken from along line 2-2 in FIG. 1.
Figure 3:
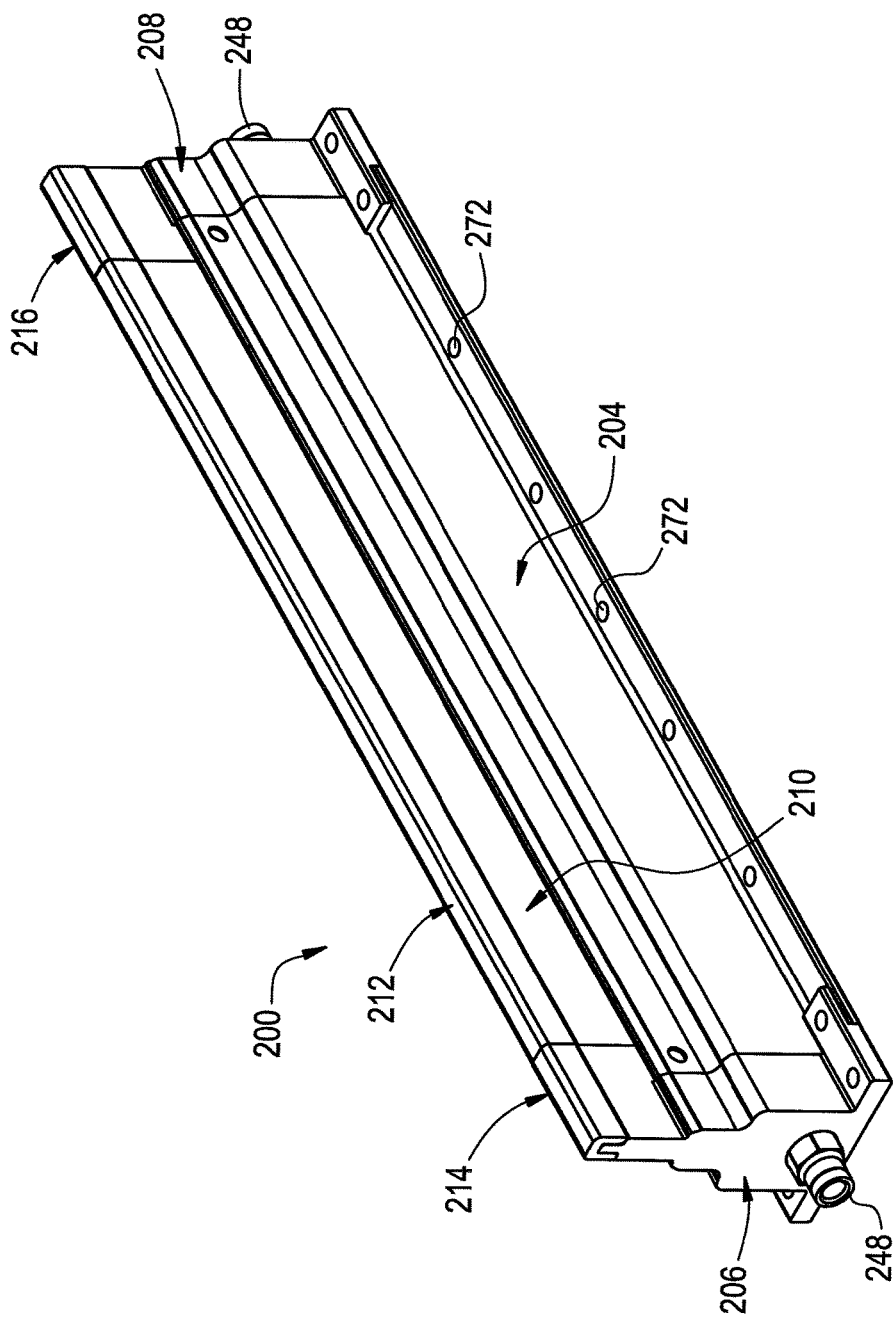
FIG. 3 is a top perspective view of one example of an actuator in accordance with the subject matter of the present disclosure.
Figure 4:
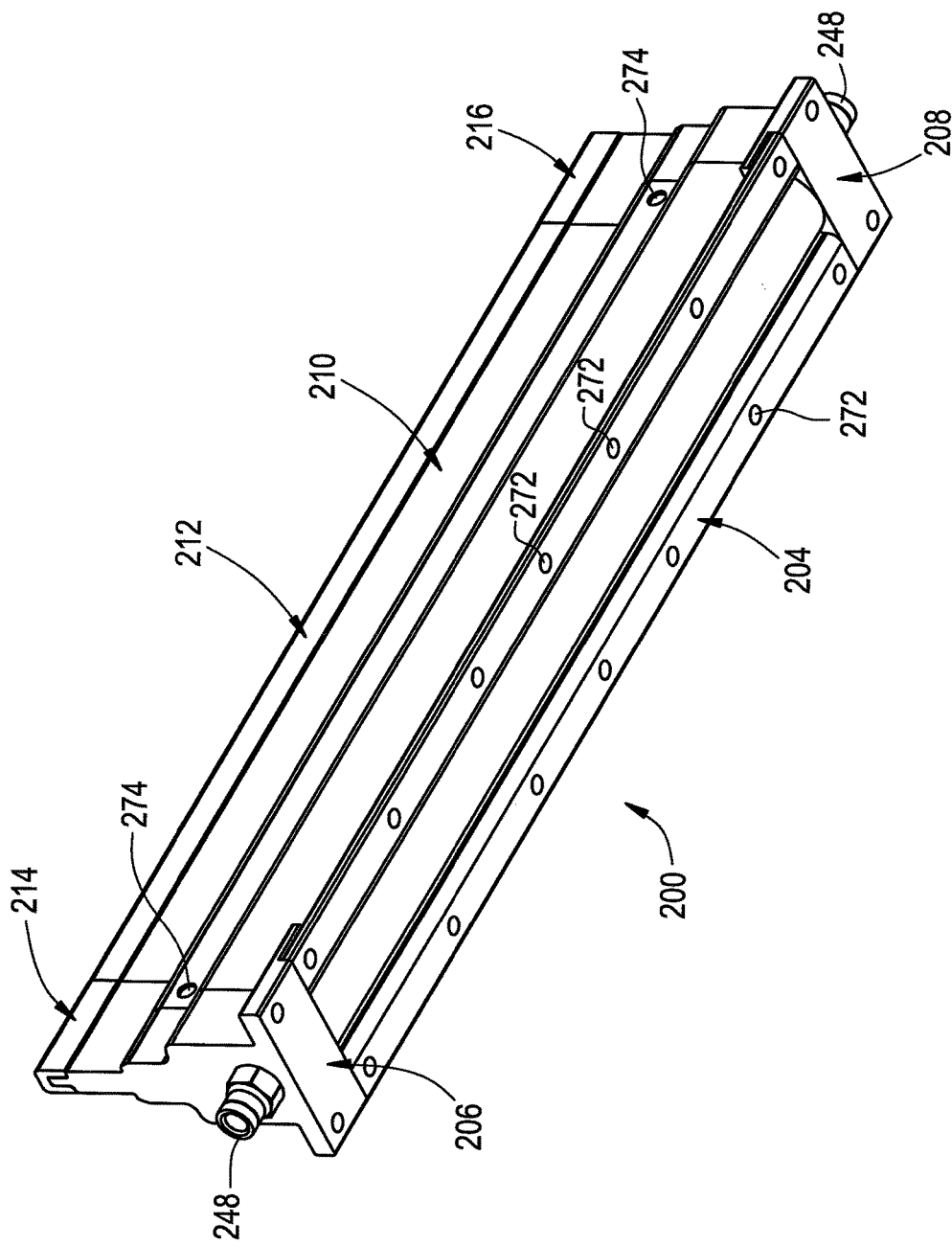
FIG. 4 is a bottom perspective view of the exemplary actuator shown in FIG. 3.
Figure 5:
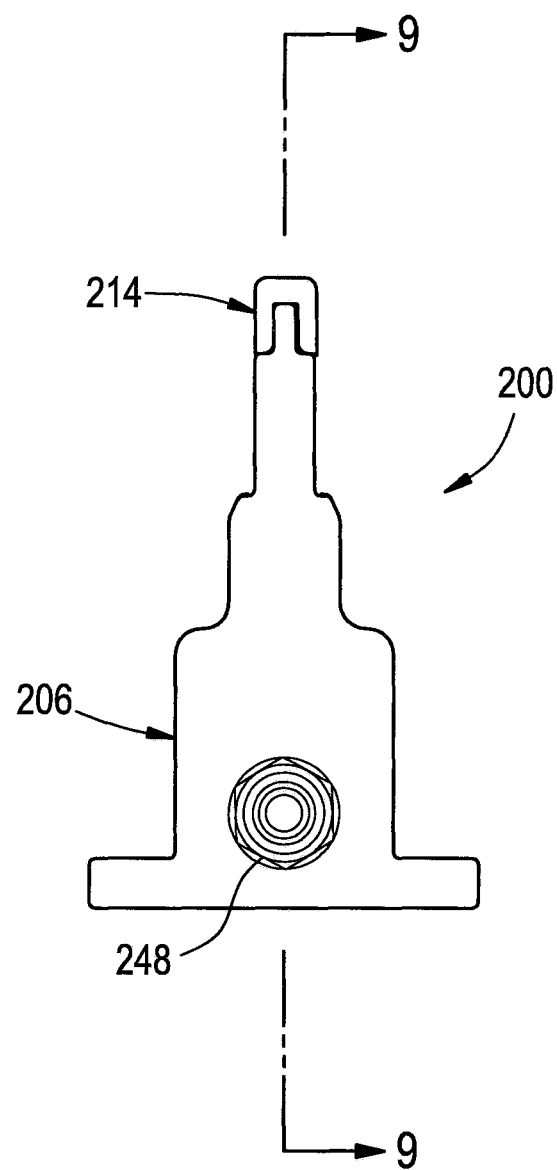
FIG. 5 is a side view of the exemplary actuator shown in FIGS. 3 and 4.
Figure 6:
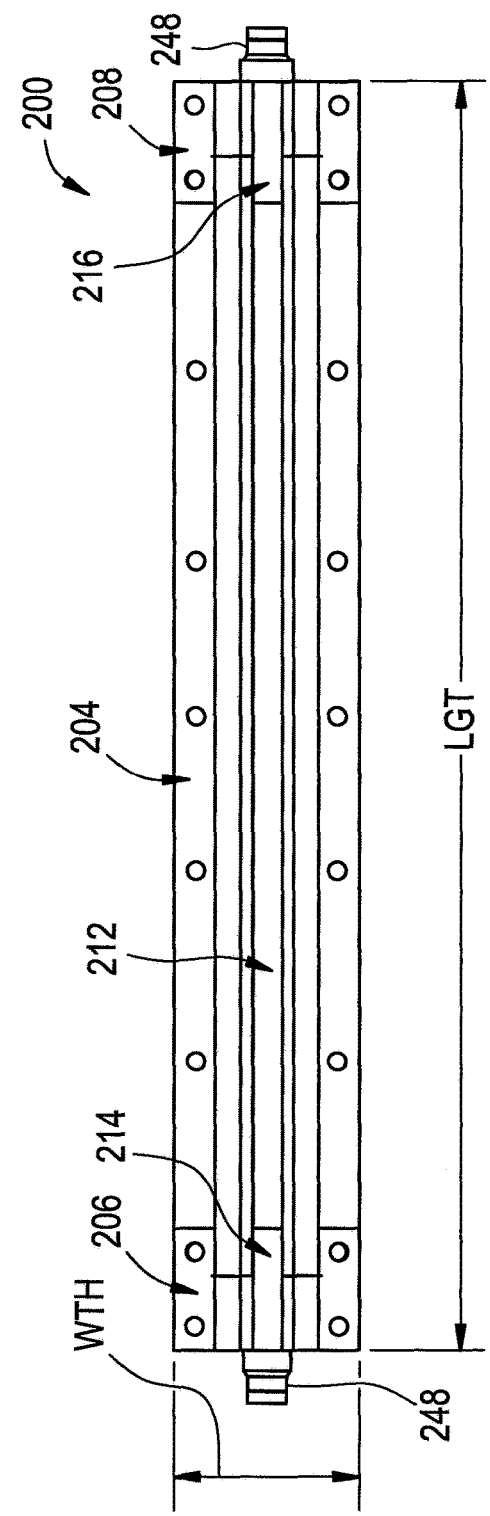
FIG. 6 is a top view of the exemplary actuator shown in FIGS. 3-5.
Figure 7:
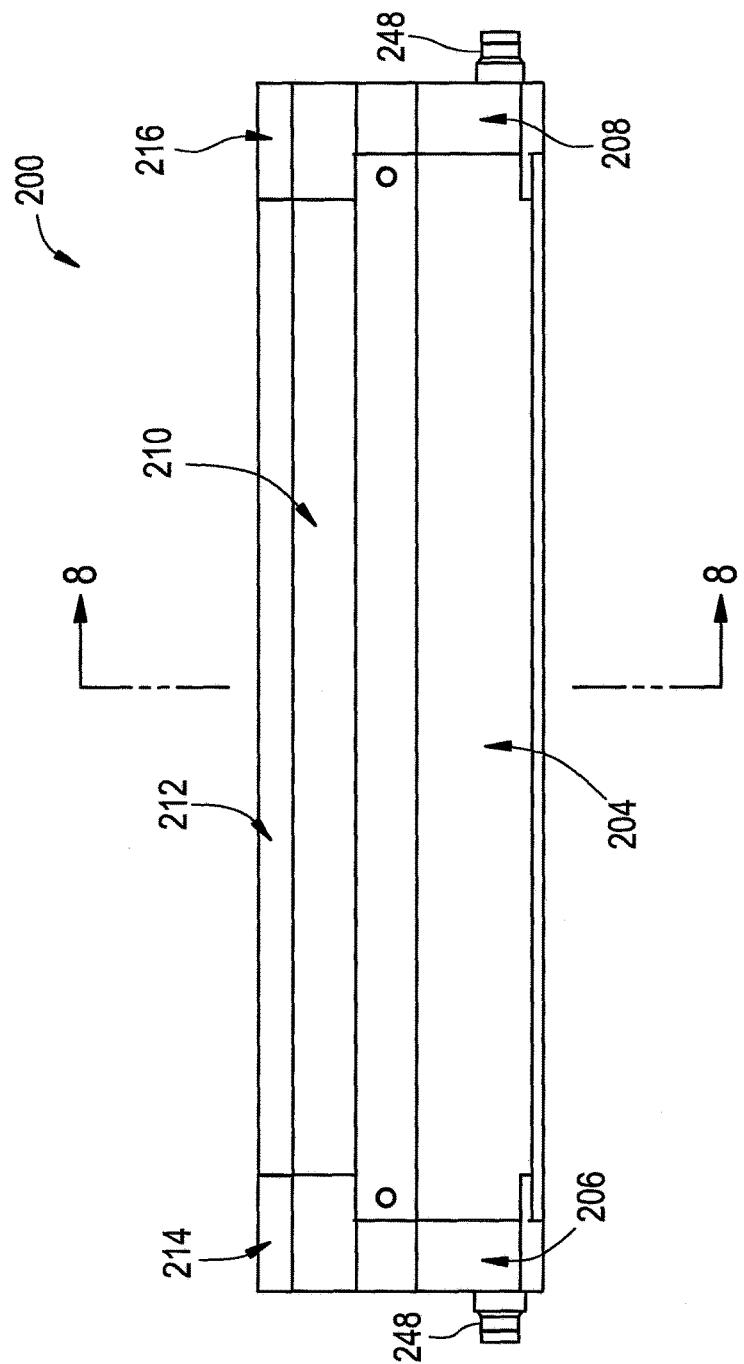
FIG. 7 is a front view of the exemplary actuator shown in FIGS. 3-6.

Conveying system 100 can include a conveyor assembly 102 as well as one or more other systems, components and/or devices that are operatively associated with conveyor assembly 102 and/or one another. Conveyor assembly 102 can include a frame assembly 104 that functions as a stationary structure, and a conveyor belt 106 that is supported on frame assembly 104 and is movable relative thereto. It will been appreciated that a wide variety of conveyor belt constructions can and have be developed for use in a broad array of applications and environments. It will be appreciated that conveyor system 100, conveyor assembly 102, frame assembly 104 and conveyor belt 106 are schematically illustrated in FIGS. 1 and 2. As such, it is to be recognized and understood that the features thereof are merely exemplary and are intended to be representative of any of such known constructions.

Frame assembly 104 can include a frame 108 that extends longitudinally between opposing ends 110 and 112 and laterally between opposing sides 114 and 116. Frame 108 can include a plurality of rail members 118 that are spaced laterally apart from one another and extend in a generally longitudinal direction. A plurality of tie member 120 can extend in a generally lateral direction between the rail members. In a preferred arrangement, the tie members can operatively interconnected with rail members 118 to form a substantially-rigid frame structure. Rolls 122 and 124 can be supported on frame 108 along ends 110 and 112, respectively. In a preferred arrangement, one of rolls 122 and 124 is supported on frame 108 for rotational motion about a lateral axis AX, and is operatively associated with a rotational motion source 122A or 122B to function as a drive roll for conveyor assembly 102. In such case, the other of rolls 122 and 124 can be supported on frame 108 for substantially free rotation about a lateral axis AX and can function as a driven roll of conveyor assembly 102.

Frame assembly 104 can, optionally, include one or more roller assemblies 126 extending longitudinally along frame 108. If provided, roller assemblies can include roller supports 128 that are secured on or along the frame, such as on or along tie members 120 and/or a platform or deck (not shown) supported thereon. Roller supports 128 can be oriented such that rollers 130 extend lengthwise along the frame assembly and rotate about roller axes (not shown) oriented longitudinally along the frame. In a preferred arrangement, a plurality of roller assemblies 126 are included in spaced relation to one another in a lateral direction, such as is shown in FIG. 2, for example.

Conveyor belt 106 is supported on frame assembly 104 and is operatively engaged with rolls 122 and 124 such that the conveyor belt can be displaced relative to frame 108 as the rolls are rotated about axes AX. In a preferred arrangement, conveyor belt 106 can take the form of an endless or otherwise continuous loop of material and/or components that extends along a top or travel side 132 of conveyor assembly 102, around one of rolls 122 and 124, along a bottom or return side 134 of conveyor assembly and back around the other of rolls 122 and 124. It will be appreciated that conveyor belt 106 can be of any type, kind and/or construction that may be suitable for use in connection with the particular application and/or environment within which the conveying system will be used. As one example, the conveyor belt could be formed form one or more lengths of flexible material that are connected end-to-end in a suitable manner to form a continuous loop of material.

As another example, conveyor belt 106 can be assembled from a plurality of conveyor segments 136 that are connected together in a suitable manner to form an extended length of belt material that can then be joined end-to-end to form a continuous loop of material. In some cases, the conveyor belt can be displaced in abutting engagement along the frame assembly or one or more components thereof. In other cases, conveyor segments 136 can act as a carrier for one or more rollers 138 that are supported thereon. In such case, rollers 138 can be disposed in abutting engagement with rollers 130 during at least some conditions of use of conveying system 100. For example, conveyor belt 106 can be displaced during use in a direction of travel represented by arrow TRV in FIG. 1. During such travel, rollers 138 can support packages, products, baggage or other materials (not shown) disposed on conveyor belt 106. By selectively operating rollers 130, rollers 138, which are disposed at an acute angle relative to the longitudinal direction of the conveyor belt, can be selectively rotated to alter the orientation and/or position of materials disposed on the conveyor belt.

Conveyor assembly 102 can also include actuator assemblies 140 that are operatively disposed between conveyor belt 106 and frame assembly 104. During use, actuator assemblies 140 can be selectively operated to disengage rollers 138 from rollers 130 and thereby alter the influence that rollers 138 have on the materials disposed on the section of the conveyor belt supported by the actuators. In the exemplary arrangement shown in FIGS. 1 and 2, actuator assemblies 140 are supported on tie members 120 of frame assembly 108 and extend toward a bottom surface 106A of conveyor belt 106. In a preferred arrangement, actuator assemblies 140 can be disposed in abutting engagement with the bottom surface of conveyor belt 106 during use. The actuator assemblies can be selectively actuated and thereby extended to lift, force or otherwise urge the associated section of the conveyor belt in a direction away from the frame assembly. In this manner, rollers 138 of the section of the conveyor belt influenced by the actuator assemblies are displaced into a non-contact condition with rollers 130.

It will be appreciated that actuator assemblies of any suitable size, shape, length, quantity and/or construction could be used. As shown in FIGS. 1 and 2, for example, a plurality of actuator assemblies 140 are disposed in spaced relation to one another in the lateral direction. Additionally, groups 140A, 140B and 140C of pluralities of actuator assemblies are disposed in spaced-relation to one another in the longitudinal direction of conveyor assembly 102. As illustrated in FIG. 2, actuator assemblies 140 can be interleaved between one or more additional features and/or components of the conveyor assembly, such as between adjacent ones of roller assemblies 126, for example. Also, in some cases, the actuator assemblies in a particular row or group can be substantially identical. In other cases, however, actuator assemblies in a particular row or group can have different physical characteristics, such as different lengths, for example. It will be appreciated that actuator assemblies 140 can be of any suitable length, such as within a range of from approximately one (1) inch in overall length to greater than ten (10) feet in overall length, for example.

Conveying system 100 can also optionally include a pressurized gas system 142 that is operatively associated with at least actuator assemblies 140 for selectively supplying pressurized gas (e.g., air) thereto and selectively transferring pressurized gas therefrom. In the exemplary embodiment shown in FIG. 1, pressurized gas system 142 includes a pressurized gas source, such as a compressor 144, for example, for generating pressurized air or other gases. The pressurized gas system can also include any number of one or more control devices of any suitable type, kind and/or construction that may be capable of permitting and/or preventing the selective transfer of pressurized gas. For example, a valve assembly 146 is shown as being in communication with compressor 144 and can be of any suitable configuration or arrangement. In the exemplary embodiment shown, valve assembly 146 includes a valve block 148 with a plurality of valves 150 supported thereon. Valve assembly 146 can also optionally include a suitable exhaust, such as a muffler 152, for example, for venting pressurized gas from the system. Optionally, pressurized gas system 142 can also include a reservoir 154 in fluid communication with valve assembly 146 and suitable for storing pressurized gas for an extended period of time, such as hours, days, weeks or months, for example.

The one or more control devices, such as valve assembly 156, for example, can be in communication with actuator assemblies 140 in any suitable manner, such as, for example, through suitable gas transmission lines 156. As such, pressurized gas can be selectively transferred to and/or from the actuator assemblies through valve assembly 146, such as to selectively actuate or otherwise alter or maintain the actuator height. It will be appreciated that actuator assemblies 140 can be disposed in fluid communication with pressurized gas system 142 in any suitable manner and/or fluidic arrangement. For example, two or more of actuator assemblies 140 (in the same or different group) can be disposed in fluid communication with one another in parallel, such as is represented by the groups 140A, 140B and 140C relative to one another. As another example, two or more of actuator assemblies 140 (in the same or different group) can be disposed in fluid communication with one another in series, such as is represented by the actuator assemblies in groups 140A, 140B and 140C, for example.

Conveyor system 100 also includes a control system 158 that is capable of communication with any one or more other systems and/or components (not shown) of conveyor system 100 and/or other systems, and is capable of selective operation and control of one or more actuator assemblies 140 and/or pressurized gas system 142. Control system 158 includes a controller or electronic control unit (ECU) 160 in communication with compressor 144 and/or valve assembly 146, such as through a suitable conductor or lead 162, for example, for selective operation and control thereof, including supplying and exhausting pressurized gas to and from any number of one or more actuator assemblies 140. Additionally, it will be appreciated that controller 160 can be of any suitable type, kind and/or configuration. In a preferred arrangement, actuator assemblies 140 are constructed to perform many thousands or even millions of actuations. In a preferred arrangement, actuator assemblies 140 can generate a lifting or actuation force of at least 25 pounds per 8 inch section of actuator length. In a preferred arrangement, pressurized gas system 142 and/or control system 158 are operative to selectively energize actuator assemblies at a rate of at least one-half (½) cycle per second. Actuator assemblies 140 and/or pressurized gas system 142 are preferably configured for operation of the actuator assemblies within a pressure range of from approximately 10 pounds per square inch ("psi") to approximately 100 psi, and more preferably within a pressure range of from approximately 20 psi to approximately 50 psi.

Figure 8:
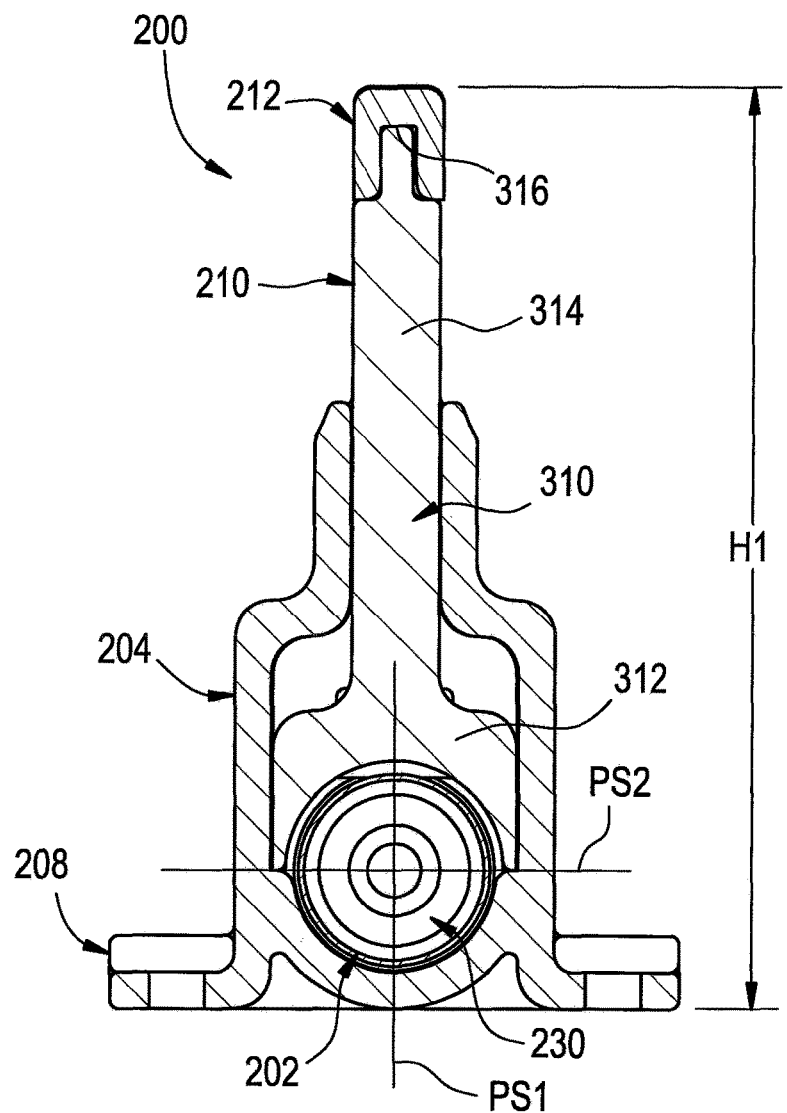
FIG. 8 is a cross-sectional view of the exemplary actuator in FIGS. 3-7 taken from along line 8-8 in FIG. 7 and shown in a first condition of use.
Figure 8A:
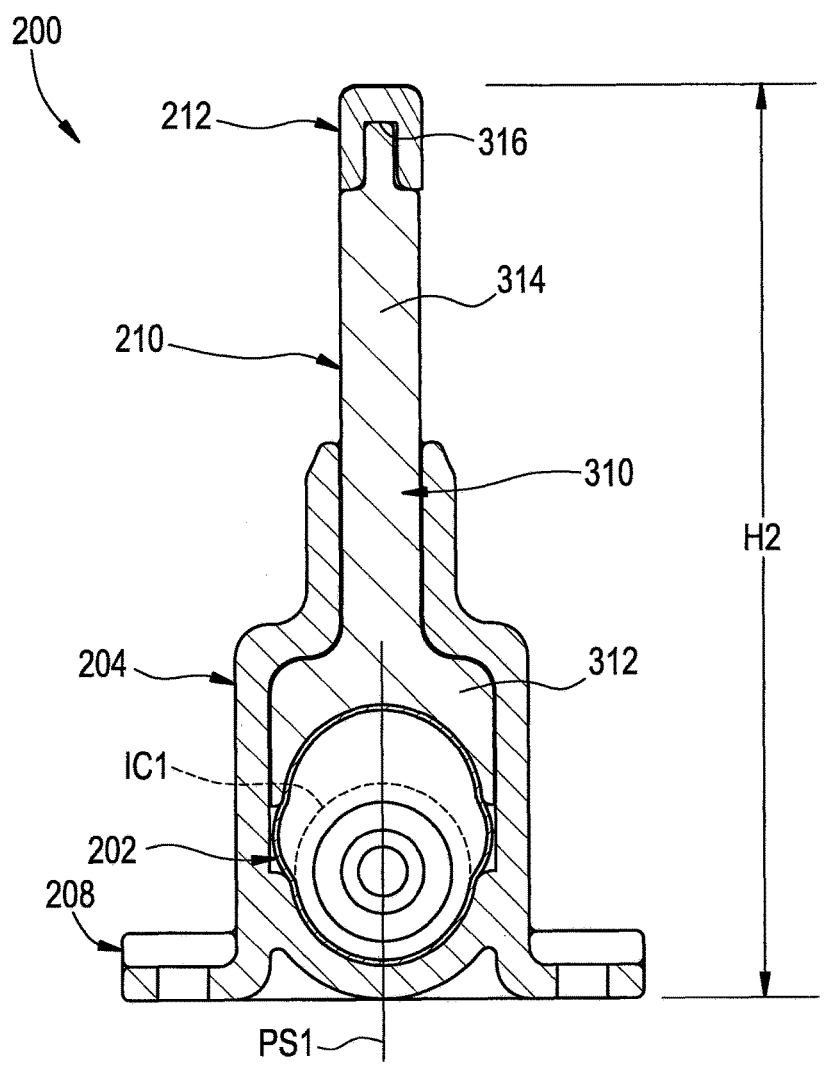
FIG. 8A is the cross-sectional view of the exemplary actuator in FIG. 8 shown in a second condition of use.

Having described an example of a conveying system (e.g., conveying system 100) that can include one or more actuator assemblies (e.g., actuator assemblies 140) in accordance with the subject matter of the present disclosure, one example of such an actuator assembly will now be described in connection with FIGS. 3-10. As shown therein, an actuator assembly 200, such as may be suitable for use as one or more of actuator assemblies 140, for example, can have a length, a width and a height. Length and width are respectively represented in FIG. 6 by reference dimensions LGT and WTH. Height in a first condition of use, which corresponds to a retracted or non-actuated condition, is represented in FIG. 8 by reference dimension H1. Height in a second condition of use, which corresponds to an extended or actuated condition, is represented in FIG. 8A by reference dimension H2.

Actuator assembly 200 includes a gas spring assembly 202 that is capable of undergoing selective inflation and deflation to thereby displace actuator assembly 200 between the first and second conditions of use. Actuator assembly 200 also includes a base element 204 that extends lengthwise along and can form a substantial portion of length LGT. Additionally, a substantial portion of the length of gas spring assembly 202 can be received and retained within base element 204. End elements 206 and 208 receive and retain end portions of gas spring assembly 202. It will be appreciated that end elements 206 and 208 are disposed along opposing ends of base element 204 and can be secured thereto in any suitable manner, such as by way of a threaded fastener or a pin connection, for example. A piston element 210 is received within base element 204 and is displaceable relative to the base and end elements in the heightwise direction in response to selective inflation and deflation of gas spring assembly 202. Actuator assembly 200 can also include one or more wear strips that may be suitable for providing improved wear performance, reduced maintenance (e.g., ease of replacement) and/or reduced costs upon extended use in contact with the associated conveyor belt (e.g., conveyor belt 106). In the arrangement shown in FIGS. 3-10, actuator assembly 200 includes a wear element 212 that is supported on piston element 210 as well as wear elements 214 and 216 that are respectively supported on end elements 206 and 208.

Gas spring assembly 202 is shown in FIGS. 3-13 as including a flexible spring member 218 that extends lengthwise between opposing ends 220 and 222. Flexible spring member 218 includes a flexible wall 224 with an outer surface 226 and an inner surface 228 that at least partially defines a spring chamber 230. Flexible wall 224 can be of any suitable configuration and/or construction. As one example, flexible wall 224 can be formed from one or more layers or plies of elastomeric material (e.g., natural rubber, synthetic rubber and/or thermoplastic elastomer). In some cases, one or more reinforcing layers or plies can be embedded or otherwise included within the flexible wall. In a preferred arrangement, however, flexible wall 224 can be formed substantially entirely from one or more layers or plies of elastomeric material without including reinforcing plies. In such case, it may be possible to utilize additional and/or alternate assembly techniques that could, in some cases, be beneficial for reducing assembly costs.

It will be appreciated that flexible spring member 218 can include end treatments of any suitable type and/or kind along the opposing ends of flexible wall 224. In some cases, one or more mounting beads (not shown) or other features could be included. In the arrangement shown in FIGS. 3-13, flexible wall 224 terminates at cut ends or edges 232. End members 234 and 236 are respectively disposed along ends 220 and 222 of flexible spring member 218. In an installed condition, end members 234 and 236 can be disposed in an approximately co-axial arrangement such that a spring axis AXS extends lengthwise along gas spring assembly 202 between the end member. In some cases, the end members can be substantially different from one another and can be operatively secured on or along the flexible spring member in different ways. In the arrangement shown in FIGS. 3-13, however, end members 234 and 236 are substantially similar to one another and include an outer surface 238 dimensioned to receivingly engage a portion of inner surface 228 of flexible wall 224. Optionally, one or more securement features can be provided on or along outer surface 238, such as one or more annular ridges and/or grooves, for example.

In some cases, end members 234 and 236 can include an outer flange portion 240 that at least partially defines a shoulder surface (not numbered) toward which edges 232 can be disposed. In some cases, edges 232 can abuttingly engage the shoulder surface. It will be appreciated that the portions of flexible wall 224 extending along outer surface 238 of end members 234 and 236 can be secured therealong in any suitable manner. For example, a retaining member 242 can extend at least partially around the end of the flexible wall. The retaining member can be displaced radially inward to bias the end of the flexible wall into abutting engagement with the outer surface of the associated end member sufficient to for a substantially fluid-tight seal therebetween.

End members 234 and 236 can also include an inner surface 244 that can at least partially define a fluid communication passage 246 that extends through the end members and into fluid communication with spring chamber 230. Fluid communication passage 246 can be utilized to transfer pressurized gas into and/or out of the spring chamber, such as to and from a pressurized gas system and/or one or more other actuator assemblies. It will be appreciated, however, that any other suitable fluid communication arrangement could alternately be used. In some cases, the end members can include features suitable for operative connection with associated gas transfer lines. In other cases, one or more connector fittings can, optionally, be used. In the arrangement shown in FIGS. 3-13, for example, connector fittings 248 are operatively connected with end members 234 and 236. It will be appreciated that other configurations and/or arrangements could alternately be used.

With reference, now, to FIGS. 3-10 and 14-16, base element 204 includes an base element wall 250 that can be formed from any suitable material or combination of materials, such as a metal (e.g., steel, aluminum) and/or polymeric (e.g., polyethylene, polyurethane and/or polyamide).

Figure 14:
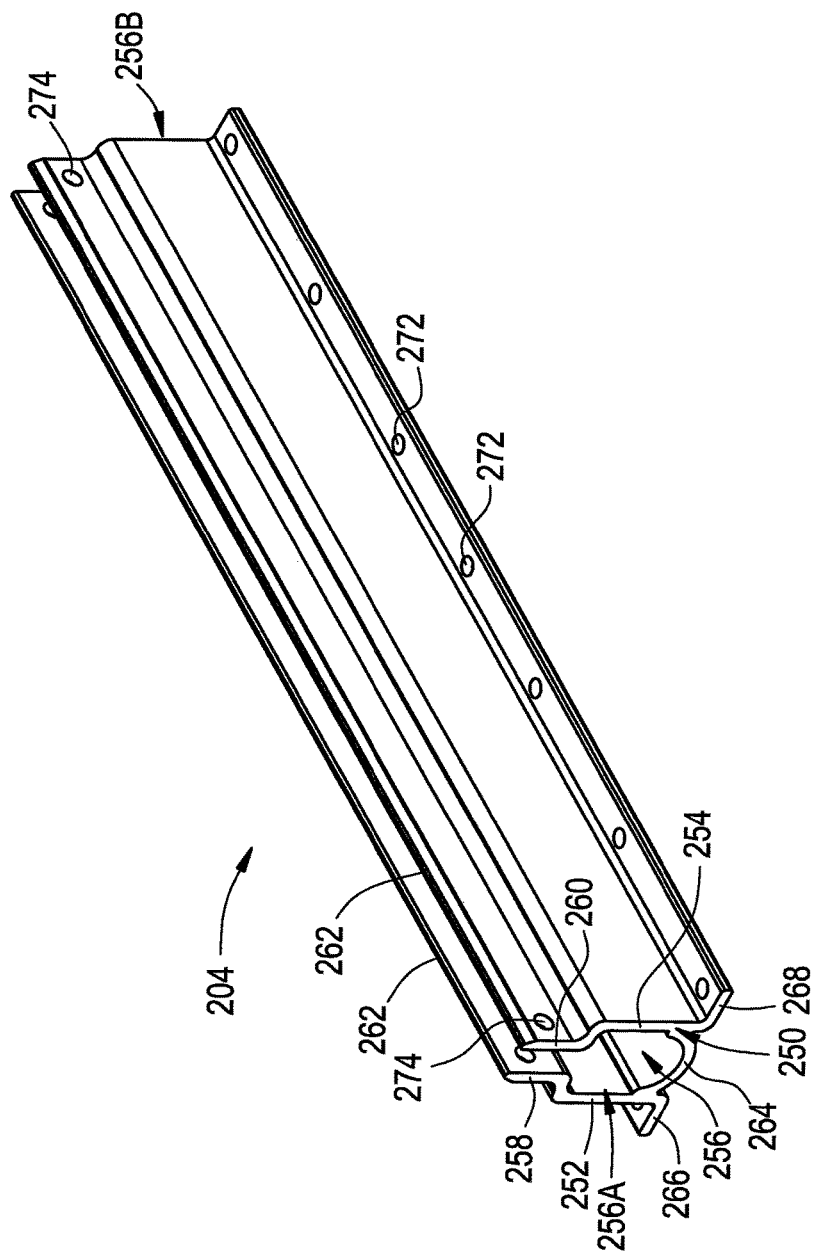
FIG. 14 is a top perspective view of one example of a base structure suitable for use in connection with the exemplary actuator shown in FIGS. 3-8, 8A, 9 and 10.
Figure 15:
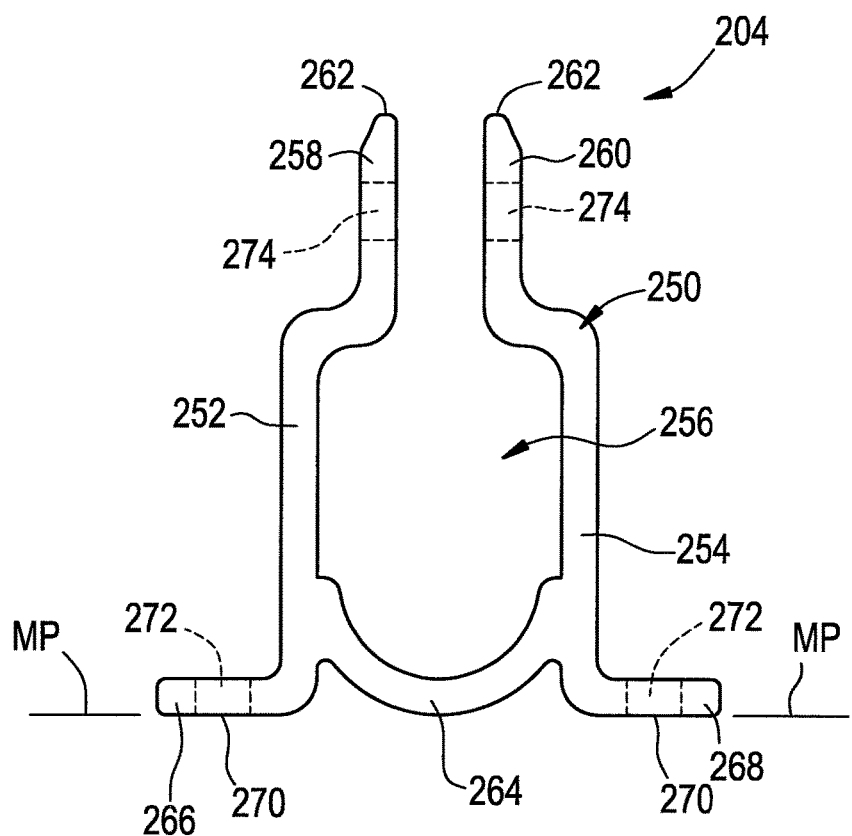
FIG. 15 is a side view of the base structure shown in FIG. 14.
Figure 16:
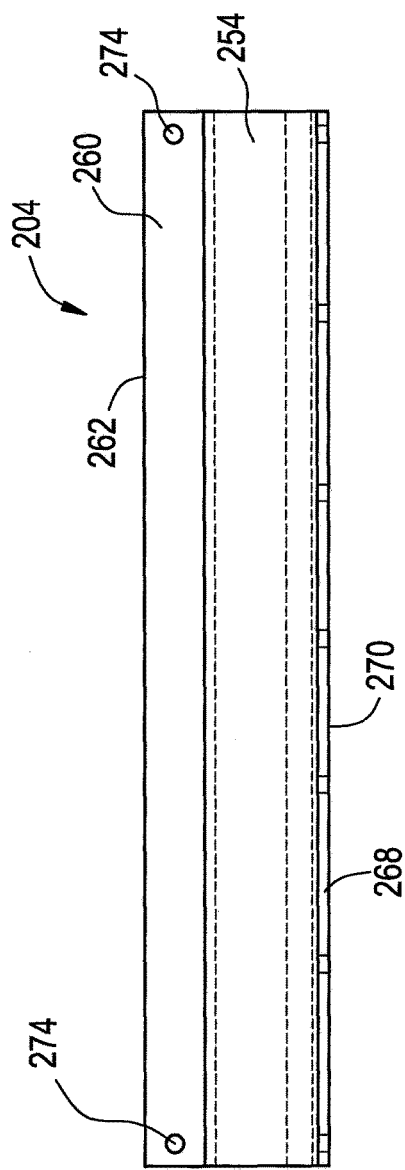
FIG. 16 is a front view of the base structure shown in FIGS. 14 and 15.
Figure 17:
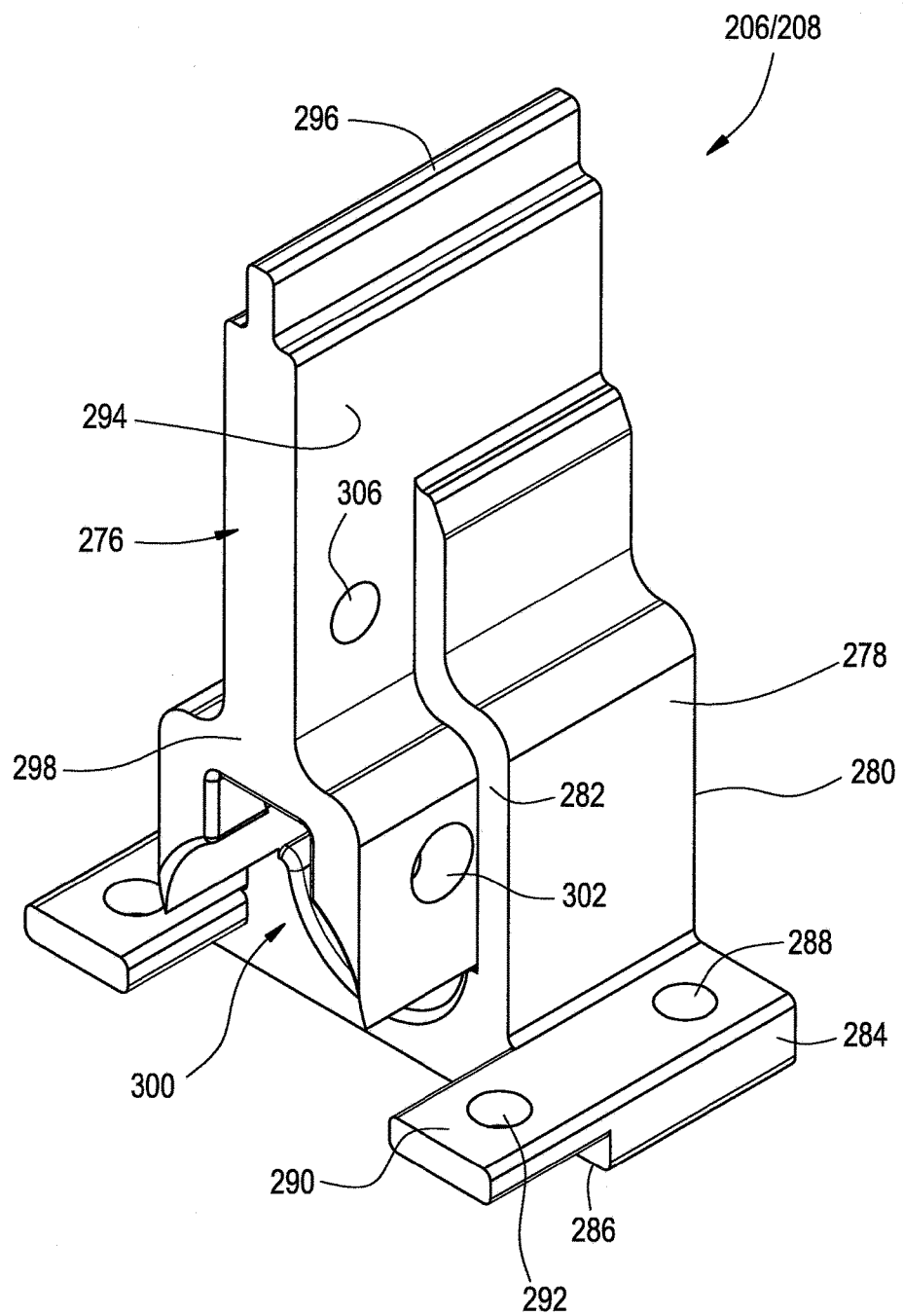
FIG. 17 is a top perspective view of one example of an end structure suitable for use in connection with the exemplary actuator shown in FIGS. 3-8, 8A, 9 and 10.
Figure 18:
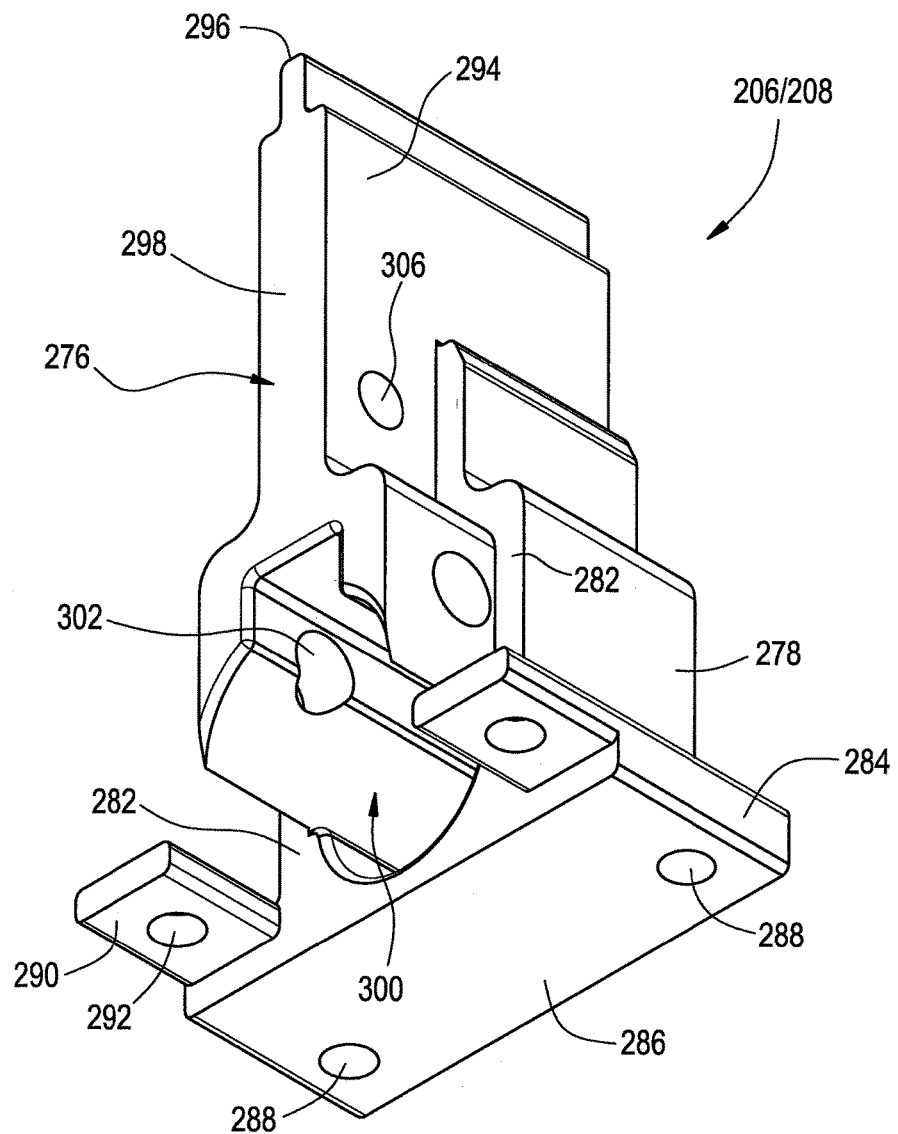
FIG. 18 is a bottom perspective view of the end structure shown in FIG. 17.
Figure 19:
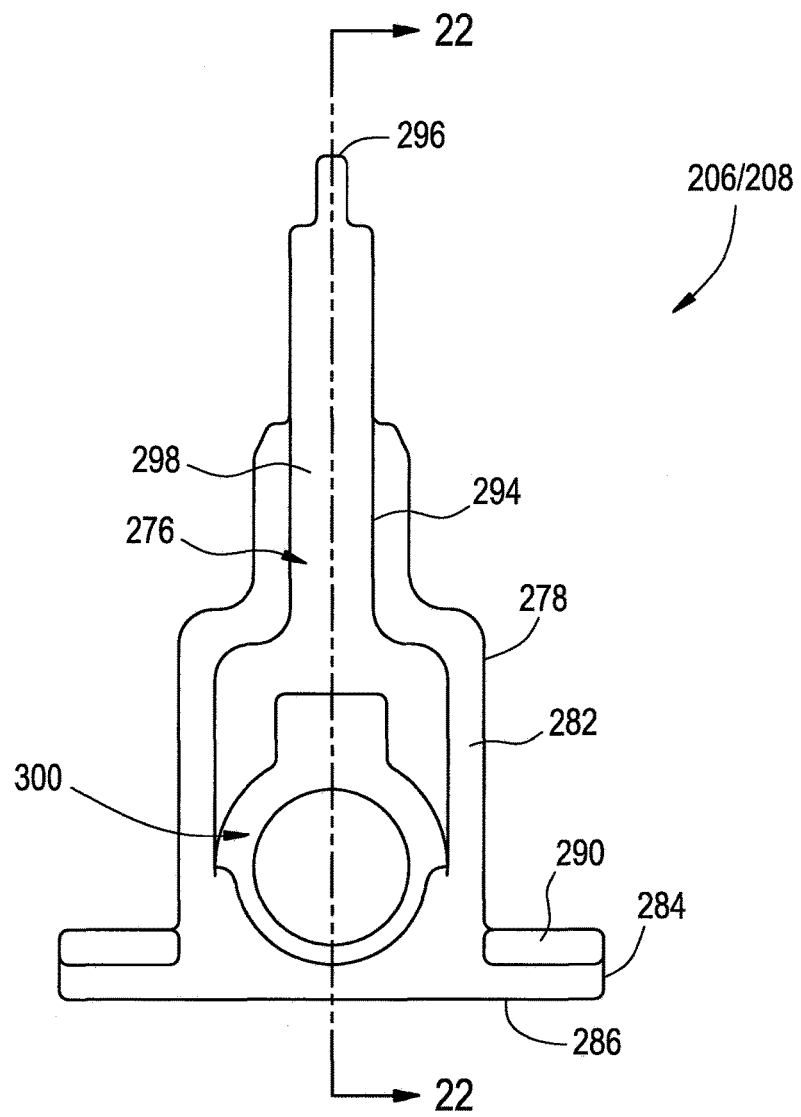
FIG. 19 is a side view of the end structure shown in FIGS. 17 and 18.
Figure 20:
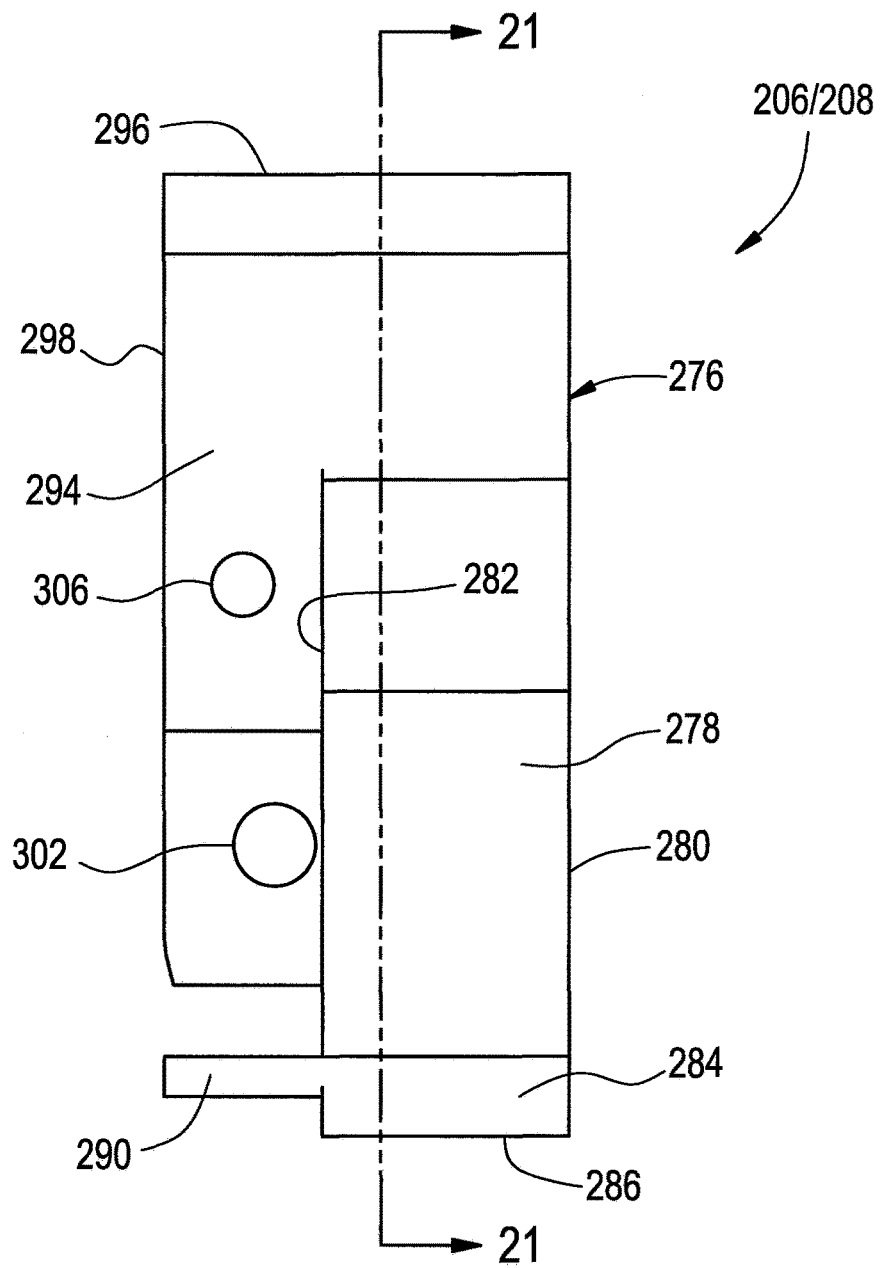
FIG. 20 is a front view of the end structure shown in FIGS. 17-19.
Figure 21:
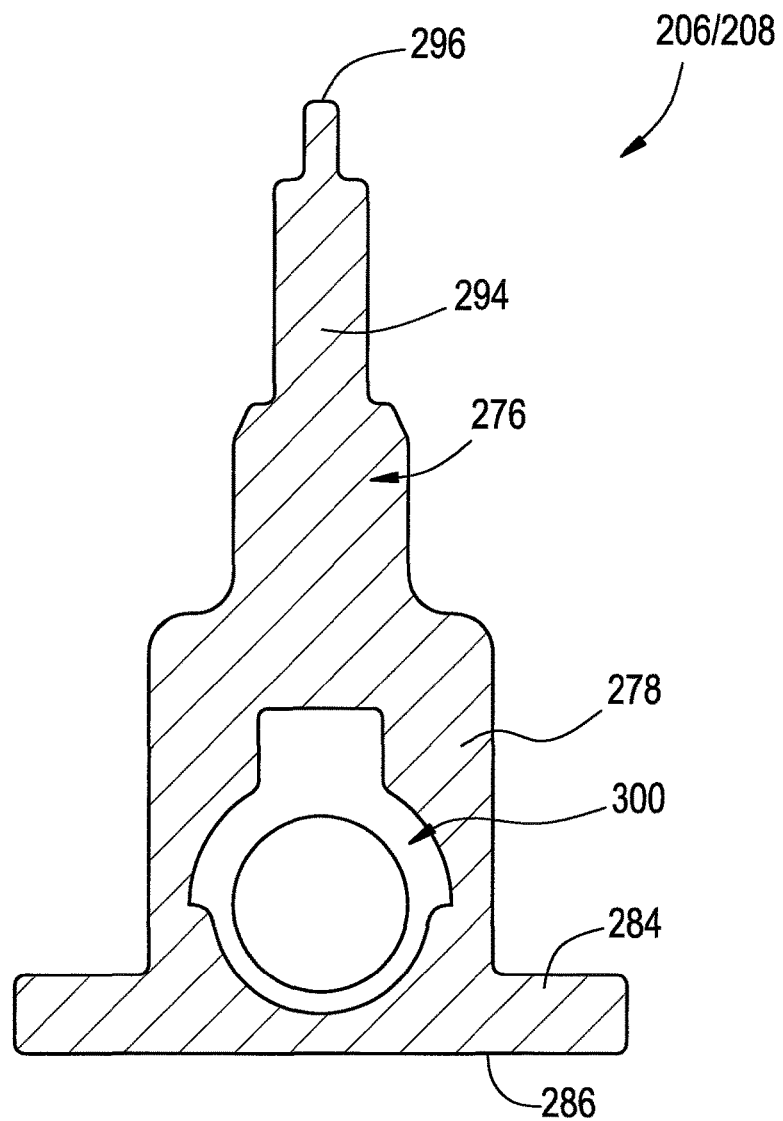
FIG. 21 is a cross-sectional view of the end structure in FIGS. 17-20 taken from along line 21-21 in FIG. 20.
Figure 22:
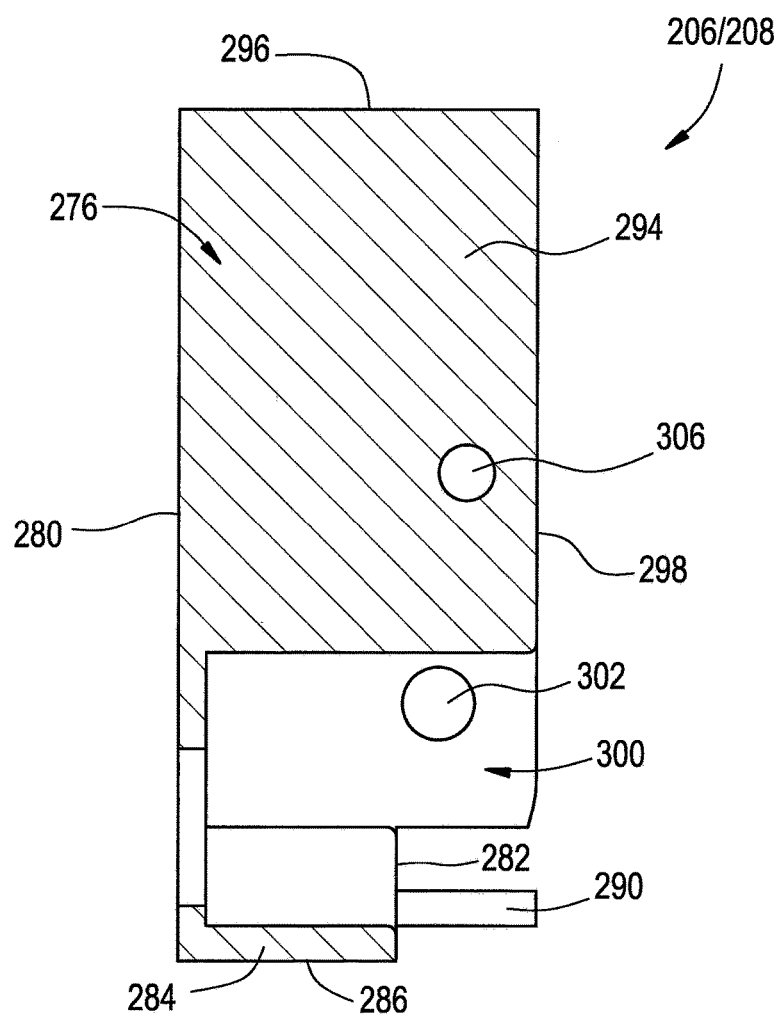
FIG. 22 is a cross-sectional view of the end structure in FIGS. 17-21 taken from along line 22-22 in FIG. 19.

It will be appreciated that base element wall 250 can include any suitable number of walls and/or wall portions. For example, base element wall 250 is shown as having a side or cross-sectional profile with side wall portions 252 and 254 that are spaced in a widthwise direction from one another and at least partially define a channel 256 extending lengthwise along base element 204. Additionally, edge wall portions 258 and 260 extend in a heightwise direction from along side wall portions 252 and 254, respectively. Edge wall portions 258 and 260 terminate in the heightwise direction at a distal edge 262, and are spaced in the widthwise direction apart from one another to further define channel 256. In a preferred arrangement, channel 256 extends lengthwise through base element 204 between opposing open ends 256A and 256B (FIG. 14).

A connector wall portion 264 extends between and operatively interconnects side wall portions 252 and 254. Connector wall portion 264 can at least partially define a closed end of channel 256 opposite distal edges 262. In the arrangement shown, connector wall portion 264 has a curved or otherwise non-linear cross-sectional profile. Mounting wall portions 266 and 268 respectively extend from along side wall portions 252 and 254. The mounting wall portions project outwardly in a widthwise direction and include a bottom or mounting surface 270 that at least partially defines a mounting plane MP for securing actuator assembly 200 to an associated structure. In some cases, mounting holes 272 can extend through mounting wall portions 266 and 268. The mounting holes, if provided, can be dimensioned to receive suitable securement devices, such as threaded fasteners, for example. Additionally, in some cases, assembly holes 274 can extend through one or more of side wall portions 252/254 and/or edge wall portions 258/260. If provided, assembly holes 274 can be dimensioned to receive a suitable securement device, such as a threaded fastener or a retaining pin, for example.

With reference, now, to FIGS. 3-10 and 17-22, end elements 206 and 208 are described in greater detail. It will be appreciated that, in some cases, end elements 206 and 208 can differ from one another in size, shape and/or construction. In the arrangement shown in FIGS. 3-10 and 17-22, however, end elements 206 and 208 are substantially similar to one another. End elements 206 and 208 include an end element wall 276 that can be formed from any suitable material or combination of materials, such as a metal (e.g., steel, aluminum) and/or polymeric (e.g., polyethylene, polyurethane and/or polyamide). It will be appreciated that end element wall 276 can include any suitable number of walls and/or wall portions. For example, end element wall 276 is shown as having an outer side wall portion 278 that can, in some cases, include an outer cross-sectional shape or profile similar to that of base element 204.

Outer side wall portion 278 of end element wall 276 can extend in a lengthwise direction from an outer end surface 280 toward a shoulder surface 282. Outer side wall portion 278 extends in a heightwise direction toward a base wall portion 284 that projects outwardly from the outer side wall portion in a widthwise direction. Base wall portion 278 includes a bottom or mounting surface 286 and can also, optionally, include one or more mounting holes 288 that extend through the base wall portion from along the mounting surface. In some cases, one or more base wall extension portions 290 can project in a lengthwise direction opposite outer end surface 280 and beyond shoulder surface 282. In a preferred arrangement, base wall extension portions 290 are offset in a heightwise direction from the base wall portion such that mounting wall portions 266 and 268 of base element 204 can be received between the base wall extension portions and an associated support structure. Additionally, in a preferred arrangement, mounting holes 292 can extend through base wall extension portions 290 in approximate alignment with a corresponding number of one or more mounting holes 272 of mounting wall portions 266 and/or 268.

End element wall 276 also includes a projection wall portion 294 that extends outwardly from along outer side wall portion 278 in a heightwise direction and in a lengthwise direction away from outer end surface 280 and beyond shoulder surface 282. Projection wall portion 294 extends in the heightwise direction toward a distal end 296 that is dimensioned to cooperatively receive and retain wear strip 214/216. It will be appreciated that at least a portion of projection wall portion 294 has a thickness in the widthwise direction that is substantially reduced in comparison with outer side wall portion 278. In a preferred arrangement, the thickness of projection wall portion 294 between outer side wall portion 278 and distal end 296 can be approximately the same thickness as a corresponding portion of piston element 210.

Projection wall portion 294 extends outwardly in the lengthwise direction beyond shoulder surface 282. In a preferred arrangement, the section of projection wall portion 294 extending beyond shoulder surface 282 can have a side or cross-sectional shape or profile that is cooperative with the size and shape of at least a portion of channel 256 of base element 204. In such case, base element 204 and end elements 206 and 208 can be assembled together such that actuator assembly 200 will have an approximately uniform exterior cross-sectional shape and/or profile. Projection wall portion 294 includes an inner end surface 298 facing opposite outer end surface 280. A recess 300 extends into projection wall portion 294 from along inner end surface 298 and is dimensioned to receive at least a portion of gas spring assembly 202, such as end member 234/236, retaining member 242 and/or connector fitting 248. In a preferred arrangement, a hole or passage 302 extends through projection wall portion 294 and is dimensioned to receive a securement device, such as a retaining pin 304, for example. In a preferred arrangement, hole 302 and retaining pin 304 are positioned and sized to assist in retaining at least a portion of gas spring assembly 202 on or along the end element during assembly and in an assembled condition of actuator assembly 200. Additionally, in a preferred arrangement, a hole or passage 306 extends through projection wall portion 294 and is dimensioned to receive a securement device, such as a retaining pin 308. Preferably, hole 306 and retaining pin 308 are positioned and sized to at least approximately align with holes 274 in an assembled condition of actuator assembly 200. In this manner, end elements 206 and 208 can received and retained on base element 204 by retaining pins 308.

Piston element 210 is shown in FIGS. 3-10 as including a piston element wall 310 that can be formed from any suitable material or combination of materials, such as a metal (e.g., steel, aluminum) and/or polymeric (e.g., polyethylene, polyurethane and/or polyamide). It will be appreciated that piston element wall 310 can include any suitable number of walls and/or wall portions. For example, piston element wall 310 is shown as having a side or cross-sectional profile with a piston base wall portion 312 and a piston edge wall portion 314 that projects in a heightwise direction from piston base wall portion 312 to a distal end 316. In a preferred arrangement, distal end 316 that is dimensioned to cooperatively receive and retain wear strip 212. In a preferred arrangement, piston edge wall portion 314 is dimensioned to be cooperatively received within the portion of channel 256 that is at least partially formed by edge wall portions 258 and 260 (e.g., extending in a heightwise direction between side wall portions 252/254 and distal edges 262).

Piston base wall portion 312 extends outwardly beyond piston edge wall portion 314 in a widthwise direction. In a preferred arrangement, piston base wall portion 312 is dimensioned to be cooperatively received within the portion of channel 256 that is at least partially formed by side wall portions 252 and 254. In the arrangement shown, piston base wall portion 312 has a curved or otherwise non-linear cross-sectional profile or shape. In some cases, the shape can be cooperative with the shape or profile of connector wall portion 264 such that the chamber extending lengthwise along the actuator assembly between the base element and the piston element has a cross-sectional shape that approximately the same as the shape of recess 300 in end elements 206 and 208. And, in a preferred arrangement, such a shape can be cooperative with flexible spring member 218 and/or gas spring assembly 202.

In an initially inflated condition and/or first condition of use, such as is shown in FIG. 8 and represented in FIG. 8A by dashed line IC1, flexible wall 224 can have a configuration that is approximately co-axial with spring axis AXS. Under such conditions, flexible wall 224 can be symmetrical about a first plane of symmetry PS1 that extends in the lengthwise and heightwise directions as well as a second plane of symmetry PS2 that is oriented transverse to the first plane of symmetry and extends in the lengthwise and widthwise directions, as shown in FIG. 8. During use, pressurized gas (e.g., air) can be transferred into and out of spring chamber 230 to inflate and deflate gas spring assembly 202. Upon transferring pressurized gas into spring chamber 230, flexible wall 224 is inflated such that outer surface 226 abuttingly engages surfaces along at least connector wall portion 264 and side wall portions 252 and 254 of base element 204 as well as piston base wall portion 312 of piston element 210, as shown in FIGS. 8 and 10 and as represented in FIG. 8A by dashed line IC1.

Figure 9:
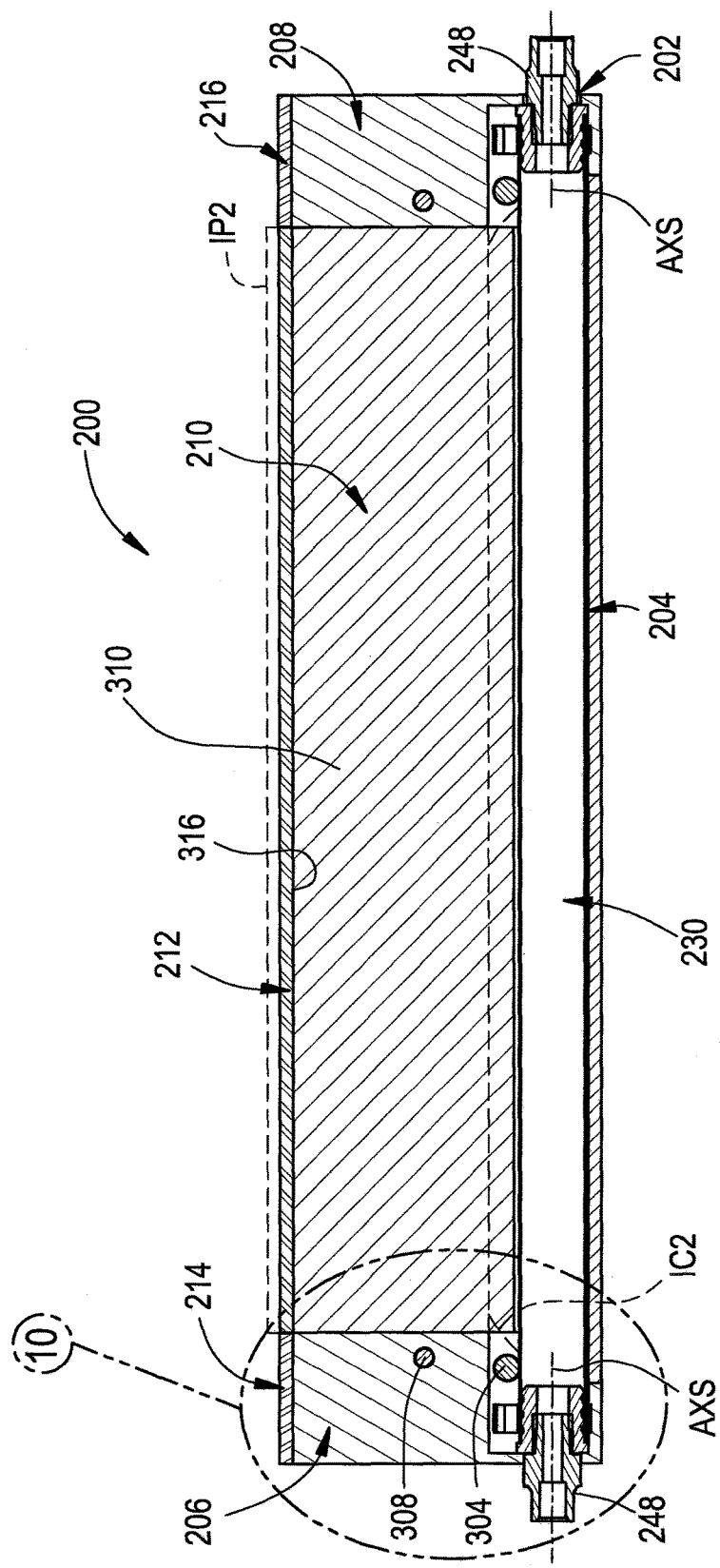
FIG. 9 is a cross-sectional view of the exemplary actuator in FIGS. 3-8 and 8A taken from along line 9-9 in FIG. 5.
Figure 10:
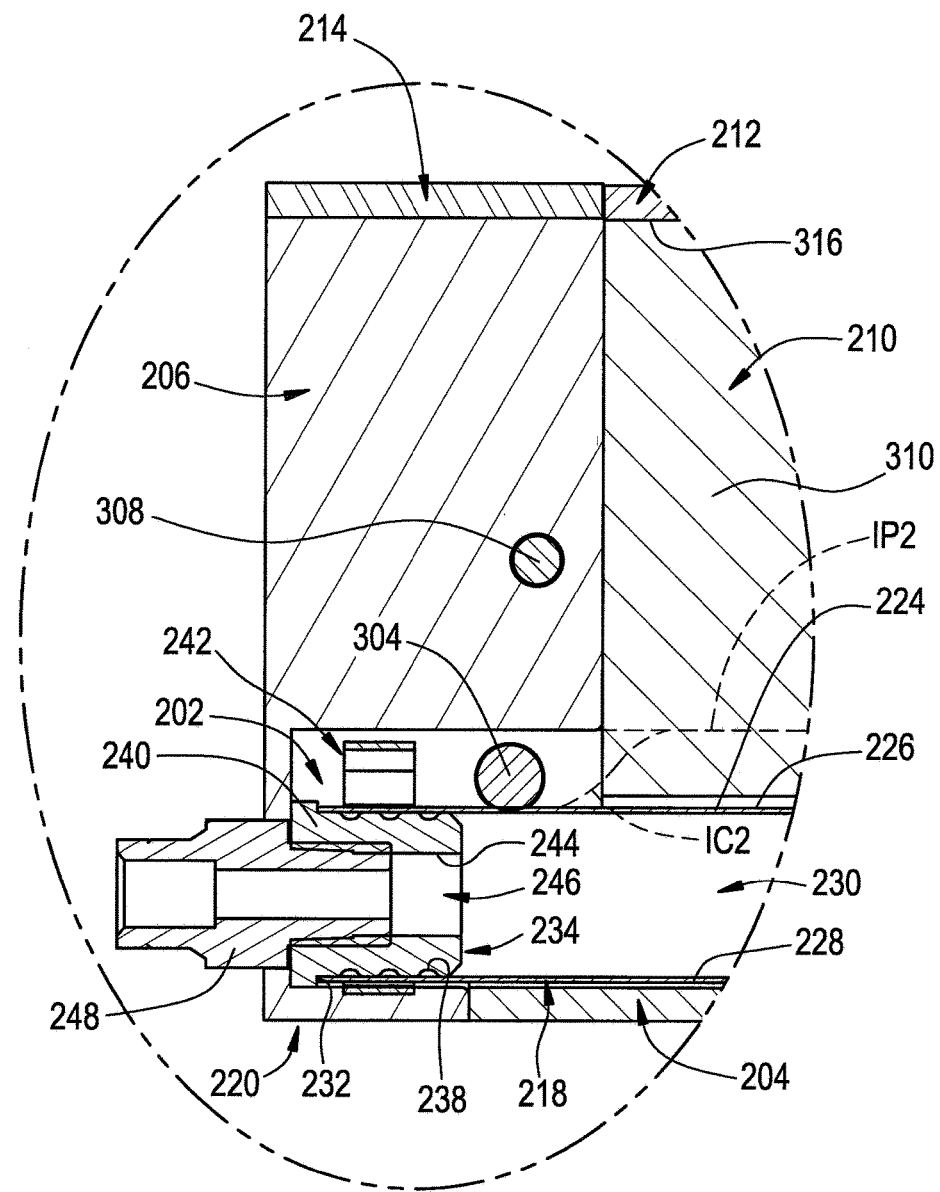
FIG. 10 is an enlarged view of the portion of the exemplary actuator in FIGS. 3-8, 8A and 9 identified as Detail 10 in FIG. 9.
Figure 11:
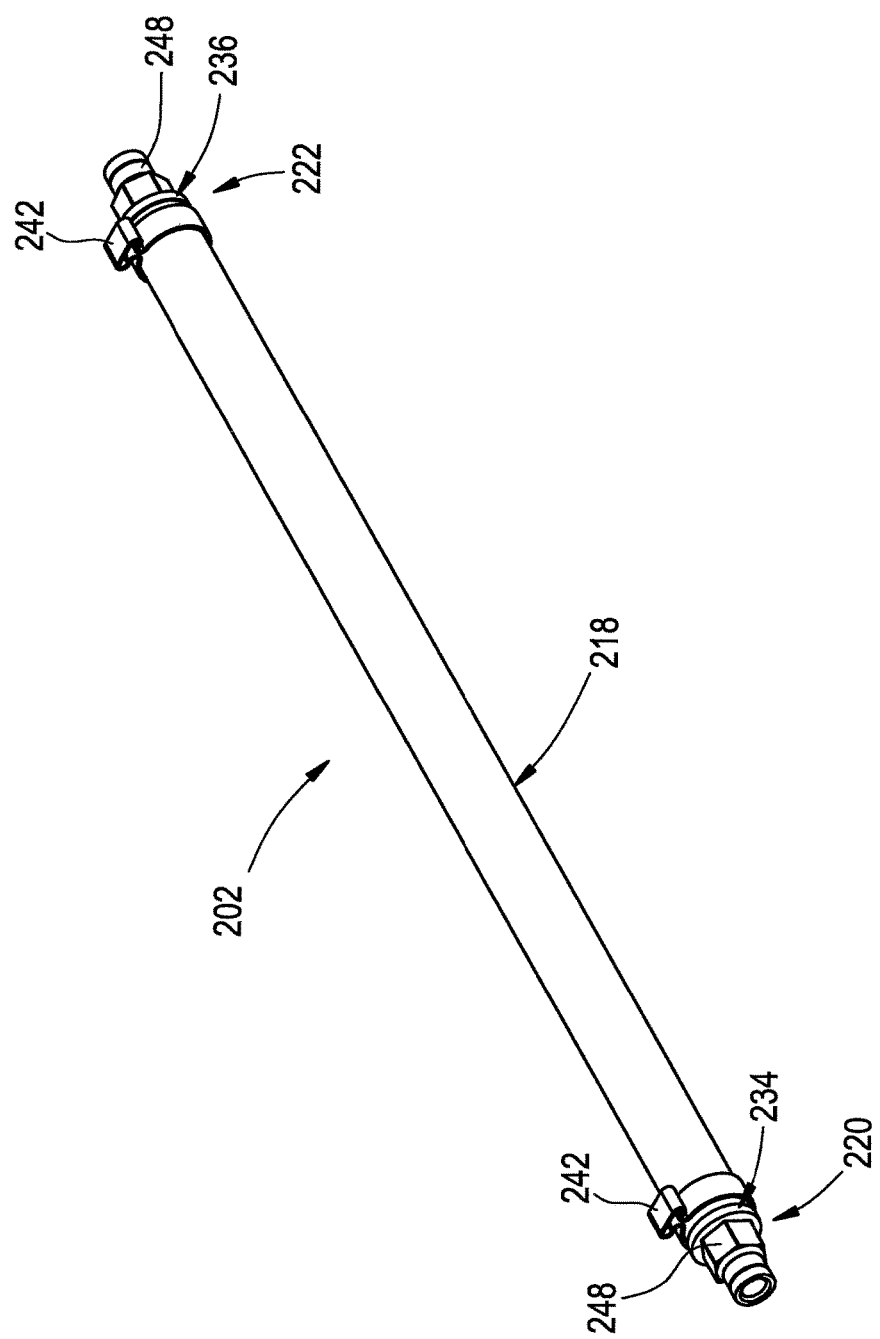
FIG. 11 is a top perspective view of one example of a gas spring assembly suitable for use in connection with the exemplary actuator shown in FIGS. 3-8, 8A, 9 and 10.
Figure 12:
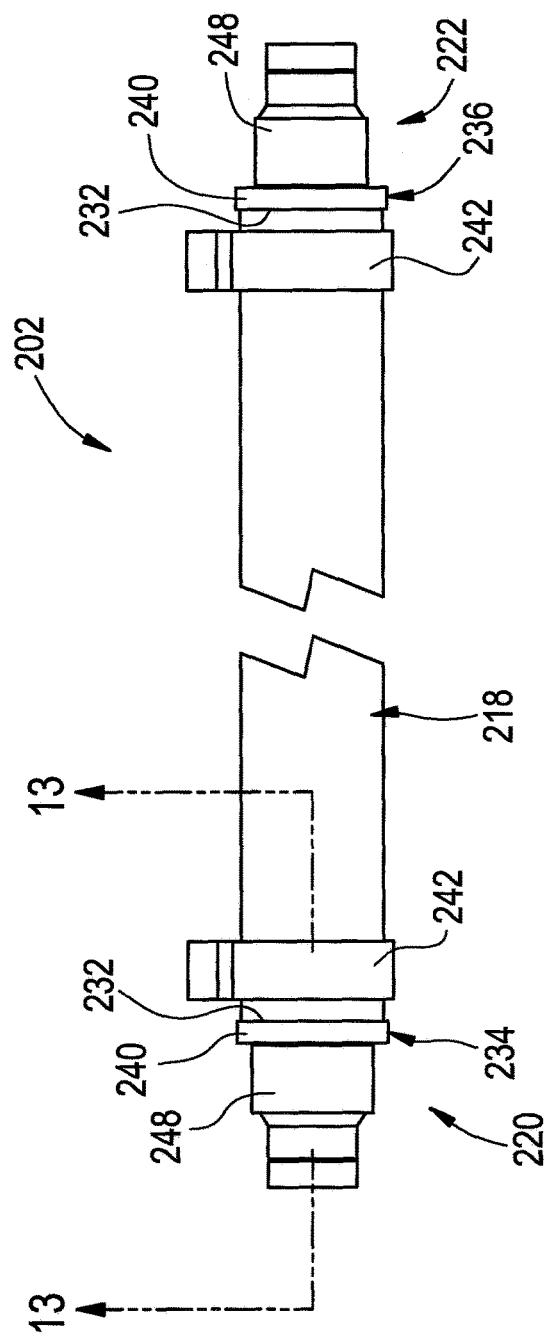
FIG. 12 is a side view of the gas spring assembly shown in FIG. 11.
Figure 13:
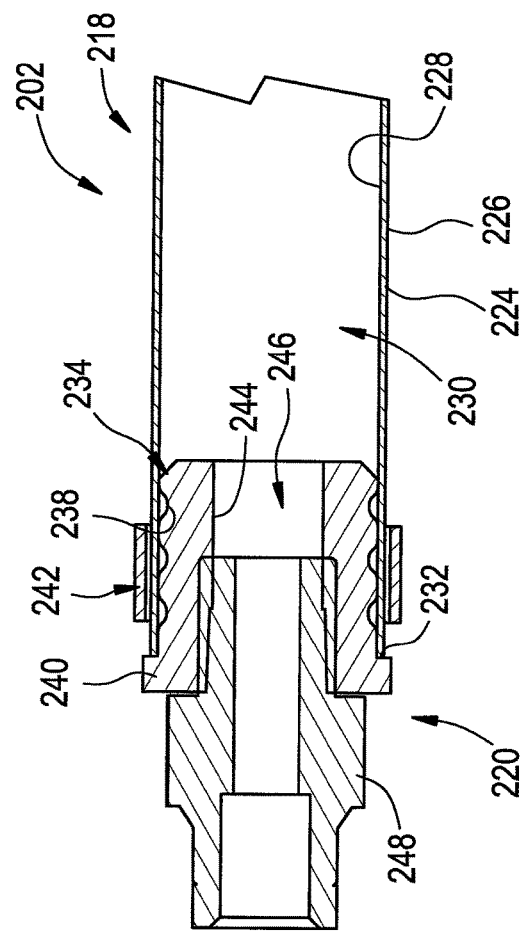
FIG. 13 is a cross-sectional view of a portion of the gas spring assembly in FIGS. 11 and 12 taken from along line 13-13 in FIG. 12.

As pressurized gas continues to transfer into the spring chamber, flexible wall 224 inflates or otherwise expands into a second condition of use, such as is shown in FIG. 8A and represented in FIGS. 9 and 10 by dashed lines IC2. Such inflation of flexible wall 224 of gas spring assembly 202 urges piston element 210 in a heightwise direction from retracted height H1 toward extended height H2, as is shown in FIG. 8A and represented in FIGS. 9 and 10 by dashed lines IP2 representing a second or inflated position of piston element 210. As pressurized gas is transferred out of spring chamber 230, the weight of the load acting on piston element 210 urges the piston element back toward height H1.

It will be appreciated that the generally fixed nature of side wall portions 252 and 254 and connector wall portion 264 together with the surface contour of piston base wall portion 312 will retain flexible wall 224 in an approximately symmetrical configuration across first plane of symmetry PS1, as shown in FIG. 8A. However, under such conditions of use, the displacement of piston element 210 in the heightwise direction allows flexible wall 224 to expand asymmetrically in the heightwise direction such that the second plane of symmetry is eliminated, as shown in FIG. 8A. Additionally, in a preferred arrangement, retaining pins 304 can provide curved surfaces along which flexible wall 224 can expand and that such substantially all of the expansion of flexible wall 224 is shown as occurring axially inward of retaining pins 304.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A conveyor actuator assembly comprising:
a gas spring assembly having a longitudinal axis and including a flexible spring member, a first end member secured to a first end of said flexible spring member and a second end member secured to a second end of said flexible spring member such that a spring chamber is formed within said flexible spring member between said first and second end members;
a base element that includes a base element wall at least partially defining a channel extending longitudinally between a first open end and a second open end and including an open side extending longitudinally between said first and second open ends with at least a portion of said gas spring assembly disposed within said channel;
a first end element receiving at least a portion of at least one of said first end member and said flexible spring member, said first end element secured along said base element and closing said first open end of said channel, said first end element including an inner side disposed in facing relation to said base element, an outer side facing away from said base element, and a recess extending into said first end element from along said inner side with at least a portion of said first end member disposed within said recess of said first end element;
a second end element receiving at least a portion of at least one of said second end member and said flexible spring member, said second end element secured along said base element and closing said second open end of said channel; and,
a piston element at least partially disposed within said channel and projecting outward beyond said base element through said open side of said channel to a distal end dimensioned for engaging an associated conveyor belt.

2. A conveyor actuator assembly according to claim 1, wherein said gas spring assembly is inflatable between a first condition in which said flexible spring member is approximately symmetrical across a horizontal plane extending along said longitudinal axis and in which said piston element disposed in a first position relative to said base element, and a second condition in which said flexible spring member is asymmetrical across said horizontal plane and in which said piston element is disposed in a second position relative to said base element that is different than said first position.

3. A conveyor actuator assembly according to claim 2, wherein said distal end of said piston assembly is disposed a first distance from said base element in said first position and is disposed a second distance from said base element in said second position with said second distance being greater than said first distance.

4. A conveyor actuator assembly according to claim 1 further comprising a first pin extending through said first end element and operative to retain said at least one of said first end member and said flexible spring member on said first end element.

5. A conveyor actuator assembly according to claim 4 further comprising a second pin extending through said second end element and operative to retain said at least one of said second end member and said flexible spring member on said second end element.

6. A conveyor actuator assembly according to claim 4, wherein said first pin has a curved outer surface and is positioned on said first end element such said flexible spring member abuttingly engages said curved outer surface in an inflated condition of said gas spring assembly.

7. A conveyor actuator assembly according to claim 1, wherein said flexible spring member extends longitudinally between a first end disposed along said first end member and a second end disposed along said second end member, said flexible spring member has a cut edge disposed along said first end, and said gas spring assembly includes a retaining ring operatively connecting said first end of said flexible spring member to said first end member such that a substantially fluid tight seal is formed therebetween.

8. A conveyor actuator assembly according to claim 7, wherein said flexible spring member has a cut edge disposed along said second end, and said gas spring assembly includes a retaining ring operatively connecting said second end of said flexible spring member to said second end member such that a substantially fluid tight seal is formed therebetween.

9. A conveyor actuator assembly according to claim 1 further comprising a wear strip element disposed along at least one of said first end element, said second end element and said piston element.

10. A conveyor actuator assembly according to claim 1, wherein said first end element includes a passage extending therethrough in fluid communication with said recess, and said gas spring assembly includes a first connector fitting extending through said passage and operatively connected in fluid communication with said first end member such that said first connector fitting is fluidically accessible from along said outer side of said first end element.

11. A conveyor actuator assembly according to claim 1, wherein said second end element includes an inner side disposed in facing relation to said base element, an outer side facing away from said base element, and a recess extending into said second end element from along said inner side with at least a portion of said second end member disposed within said recess of said second end element.

12. A conveyor actuator assembly according to claim 11, wherein said second end element includes a passage extending therethrough in fluid communication with said recess, and said gas spring assembly includes a second connector fitting extending through said passage and operatively connected in fluid communication with said second end member such that said second connector fitting is fluidically accessible from along said outer side of said second end element.

13. A conveying system comprising:
at least one conveyor actuator assembly according to claim 1; and,
a pressurized gas system including a pressurized gas source and a control device with at least one of said pressurized gas source and said control device in fluid communication with said spring chamber of said gas spring assembly.

14. A conveying system according to claim 13 further comprising:
a control system communicatively coupled with at least one of said pressurized gas source and said control device of said pressurized gas system.

15. A conveyor assembly comprising:
a frame assembly extending lengthwise between a first end and a second end;
a drive roller supported along said first end of said frame assembly;
an idler roller supported along said second end of said frame assembly;
a conveyor belt operatively connected in an endless manner along said frame assembly and displaceable upon rotation of said drive roller and said idler roller, said conveyor belt having an outward-facing side and an inward-facing side, and said conveyor belt including a plurality of roller elements operative to support associated conveyed articles and displace the associated conveyed articles relative to said conveyor belt;
a plurality of actuator rollers disposed between said frame assembly and said conveyor belt and operative to selectively rotate said plurality of roller elements; and,
a conveyor actuator assembly disposed between said frame assembly and said inward-facing side of said conveyor belt, said conveyor actuator assembly being selectively operable to engage and disengage said plurality of roller elements from said plurality of actuator rollers, and said conveyor actuator assembly including:
a gas spring assembly having a longitudinal axis and including a flexible spring member, a first end member secured to a first end of said flexible spring member and a second end member secured to a second end of said flexible spring member such that a spring chamber is formed within said flexible spring member between said first and second end members;
a base element that includes a base element wall at least partially defining a channel extending longitudinally between a first open end and a second open end and including an open side extending longitudinally between said first and second open ends with at least a portion of said gas spring assembly disposed within said channel;
a first end element receiving at least a portion of at least one of said first end member and said flexible spring member, said first end element secured along said base element and closing said first open end of said channel;
a second end element receiving at least a portion of at least one of said second end member and said flexible spring member, said second end element secured along said base element and closing said second open end of said channel; and,
a piston element at least partially disposed within said channel and projecting outward beyond said base element through said open side of said channel to a distal end dimensioned for engaging an associated conveyor belt.

16. A conveyor assembly according to claim 15, wherein said conveyor actuator assembly is one of a plurality of conveyor actuator assemblies disposed between said frame assembly and said inward-facing side of said conveyor belt, and said plurality of conveyor actuator assemblies are selectively operable to engage and disengage said plurality of roller elements from said plurality of actuator rollers.

17. A method of assembly comprising:
providing a frame assembly extending lengthwise between a first end and a second end;
securing a drive roller for rotation along said first end of said frame assembly;
securing an idler roller for rotation along said second end of said frame assembly;
connecting a conveyor belt in an endless manner along said frame assembly and around said drive roller and said idler roller such that said conveyor belt is displaceable upon rotation of said drive roller and said idler roller, said conveyor belt having an outward-facing side and an inward-facing side, and said conveyor belt including a plurality of roller elements operative to support associated conveyed articles and displace the associated conveyed articles relative to said conveyor belt;
securing a plurality of actuator rollers between said frame assembly and said conveyor belt and such that said plurality of actuator rollers are operative to selectively rotate said plurality of roller elements;
providing a conveyor actuator assembly that includes:
a gas spring assembly having a longitudinal axis and including a flexible spring member, a first end member secured to a first end of said flexible spring member and a second end member secured to a second end of said flexible spring member such that a spring chamber is formed within said flexible spring member between said first and second end members;
a base element that includes a base element wall at least partially defining a channel extending longitudinally between a first open end and a second open end and including an open side extending longitudinally between said first and second open ends with at least a portion of said gas spring assembly disposed within said channel;
a first end element receiving at least a portion of at least one of said first end member and said flexible spring member, said first end element secured along said base element and closing said first open end of said channel;
a second end element receiving at least a portion of at least one of said second end member and said flexible spring member, said second end element secured along said base element and closing said second open end of said channel; and,
a piston element at least partially disposed within said channel and projecting outward beyond said base element through said open side of said channel to a distal end dimensioned for engaging an associated conveyor belt; and,
securing said conveyor actuator assembly between said frame assembly and said inward-facing side of said conveyor belt with said conveyor actuator assembly being selectively operable to engage and disengage said plurality of roller elements from said plurality of actuator rollers.

18. A method of assembly according to claim 17, wherein providing said conveyor actuator assembly includes:
providing said gas spring assembly and said base element;
extending at least a portion of said gas spring assembly into said channel;
providing said first end element and securing said first end member of said gas spring assembly along said first end element;
providing a piston element and inserting said piston element within said channel such that a portion of said piston element projects outward beyond said base element through said open side of said channel to a distal end dimensioned for engaging an associated conveyor belt with at least a portion of said gas spring assembly captured between said piston element and said base element;

securing said first end element along a first end of said base element and thereby closing said first open end of said channel;

providing said second end element and securing said second end member of said gas spring assembly along said second end element;

securing said second end element along a second end of said base element and thereby closing said second open end of said channel.

19. A method according to claim 18, wherein:

providing said first end element includes providing said first end element with an inner side dimensioned for orientation toward said base element, an outer side dimensioned to face away from said base element, and a recess extending into said first end element from along said inner side; and, securing said first end member along said first end element includes positioning at least a portion of said first end member within said recess of said first end element as well as extending a first pin through said first end element to retain said first end member on said first end element, said first pin having a curved outer surface and positioned on said first end element such said flexible spring member abuttingly engages said curved outer surface in an inflated condition of said gas spring assembly.

20. A method according to claim 19, wherein:

providing said second end element includes providing said second end element with an inner side dimensioned for orientation toward said base element, an outer side dimensioned to face away from said base element, and a recess extending into said second end element from along said inner side; and, securing said second end member along said second end element includes positioning at least a portion of said second end member within said recess of said second end element as well as extending a second pin through said second end element to retain said second end member on said second end element, said second pin having a curved outer surface and positioned on said second end element such said flexible spring member abuttingly engages said curved outer surface in an inflated condition of said gas spring assembly.

* * * * *